US012767279B2

(12) United States Patent
Vannieuwenhuyse et al.

(10) Patent No.: US 12,767,279 B2
(45) Date of Patent: Oct. 20, 2026

(54) HANDLING SYSTEM AND METHOD FOR TRANSFERRING AN ELONGATE OBJECT FROM A STORAGE POSITION INTO AN UPENDING SYSTEM

(71) Applicant: DEME OFFSHORE BE NV, Zwijndrecht (BE)

(72) Inventors: Kenneth Gerard Vannieuwenhuyse, Zwijndrecht (BE); Joshua Tyson Beilan, Zwijndrecht (BE); Franky Ecran, Zwijndrecht (BE)

(73) Assignee: DEME OFFSHORE BE NV, Zwijndrecht (BE)

( * ) Notice: Subject to any disclaimer, the term of this patent is extended or adjusted under 35 U.S.C. 154(b) by 0 days.

(21) Appl. No.: 19/355,225

(22) Filed: Oct. 10, 2025

(65) Prior Publication Data

US 2026/0109433 A1 Apr. 23, 2026

(30) Foreign Application Priority Data

Oct. 11, 2024 (EP) .................................... 24206042

(51) Int. Cl.
*B63B 27/16* (2006.01)
*B63B 35/00* (2020.01)
(Continued)

(52) U.S. Cl.
CPC ............ *B63B 27/16* (2013.01); *B63B 35/003* (2013.01); *B63B 75/00* (2020.01); *E02D 13/04* (2013.01);
(Continued)

(58) Field of Classification Search
CPC ..... E02B 2017/0091; E02B 2017/0039; E02B 2017/0065; E02B 2017/0047;
(Continued)

(56) References Cited

U.S. PATENT DOCUMENTS

2021/0123203 A1 4/2021 Rabaut et al.
2022/0356668 A1* 11/2022 Vehmeijer ............... B63B 27/16
(Continued)

FOREIGN PATENT DOCUMENTS

NO 20220693 A1 * 10/2023 ............. B66C 1/108
WO WO-2021140217 A1 * 7/2021 ............. E02B 17/04
WO 2023153922 8/2023

OTHER PUBLICATIONS

International Search Report dated Apr. 29, 2025.

*Primary Examiner* — Gregory W Adams
(74) *Attorney, Agent, or Firm* — IPSILON USA, LLP

(57) ABSTRACT

A handling system is provided for transferring an elongate object from a storage location into an upending system, in particular on a vessel deck. The handling system has an upending system configured to upend the elongate object from a substantially horizontal position into a substantially vertical position and a skidding system configured to lift and skid the elongate object from a storage location into the upending system. The upending system has a gripper unit configured to receive and grip a first end of the elongate object. The gripper unit includes at least first ring element configured to engage an outer surface of the elongate object; and a support structure including two substantially parallelogram-shaped frames configured to support the gripper unit. The gripper unit is tiltable between a first position in which a plane including the at least first ring element is substantially vertical and a second position in which said plane is substantially horizontal.

14 Claims, 29 Drawing Sheets

(51) Int. Cl.
*B63B 75/00* (2020.01)
*E02D 13/04* (2006.01)
*F03D 13/10* (2016.01)
*F03D 13/25* (2016.01)
*E02B 17/00* (2006.01)

(52) U.S. Cl.
CPC ......... *F03D 13/126* (2023.08); *F03D 13/139* (2023.08); *F03D 13/25* (2016.05); *E02B 2017/0039* (2013.01); *E02B 2017/0091* (2013.01)

(58) Field of Classification Search
CPC ............. E02B 2017/0043; E02B 17/02; E02B 17/021; B66C 13/08; B66C 13/06
See application file for complete search history.

(56) References Cited

U.S. PATENT DOCUMENTS

| | | | | |
|---|---|---|---|---|
| 2023/0073785 | A1* | 3/2023 | Konate | E02B 17/02 |
| 2024/0068448 | A1 | 2/2024 | Sadhana | |
| 2024/0417946 | A1 | 12/2024 | Vehmeijer et al. | |

* cited by examiner

HANDLING SYSTEM AND METHOD FOR TRANSFERRING AN ELONGATE OBJECT FROM A STORAGE POSITION INTO AN UPENDING SYSTEM

RELATED APPLICATION

This application claims the benefit of priority from European Patent Application No. 24 206 042.4 filed on Oct. 11, 2024, the entirety of which is incorporated by reference.

FIELD OF THE INVENTION

The present invention generally relates to a system and a method for transferring an elongate object from a storage position into an upending system, in particular on a vessel deck.

BACKGROUND OF THE INVENTION

Even if the invention is disclosed with reference to an offshore wind turbine, the reference does not imply that the invention is limited to the field of offshore wind turbines. The handling system and method can be applied advantageously to other types of elongate objects and on different surfaces.

Different types of foundations of offshore wind turbines exist, such as for example pile foundations, in particular monopile foundations, jacket foundations including a lattice structure, gravity foundations or other foundation types known to the person skilled in the art. Said foundations are placed on, or even driven into, the seabed and are configured to support the wind turbine pile. A so-called monopile foundation generally comprises a hollow tubular element in steel or concrete. An end of the monopile generally includes a transition piece sticking out of the water when installed and configured to receive the wind turbine pile. Before installation, it is known to transport one or more of said monopiles on a vessel deck in a lying, substantially horizontal position, for example transverse to a longitudinal direction of the vessel, supported by and fastened to a pair of support structures, storage racks or cradles. It is further known to lift a monopile from such a storage position into an upending system, for example by a lifting system, as described for example in WO2021/224779, including a crane arm, a take-up frame, a winch set-up and control lines.

However, since wind turbines are being scaled up, foundations for such wind turbines are becoming larger and heavier. Monopiles can for example have a length of up to 140 m, a diameter of over 6 m and up to 15 m and a weight of more than 800 tons and even up to 5000 tons. Handling of such monopile foundations can thus become increasingly more delicate, in particular in a harsh offshore environment where wind and sea conditions can seriously complicate operations, in particular during lifting of said monopile from the storage structure to transfer said monopile into the upending system. Moreover, this lifting operation can generally take a relatively long time, for example three to four hours, during which time operation conditions should not change.

It is therefore an aim of the present invention to solve or at least alleviate one or more of the above-mentioned problems. In particular, the invention aims at providing an improved handling system and method for transferring an elongate object from a storage position into an upending system, in particular on a vessel deck, allowing relatively safe handling of the elongate object in various weather conditions.

SUMMARY OF THE INVENTION

To this aim, according to a first independent aspect of the invention, a handling system is provided. The handling system for transferring an elongate object from a storage location into an upending system, in particular on a vessel deck, the handling system comprising:

- an upending system configured to upend said elongate object from a substantially horizontal position into a substantially vertical position;
- a skidding system configured to lift and skid said elongate object from a storage location into said upending system;

wherein said upending system comprises:

- a gripper unit configured to receive and grip a first end of the elongate object, the gripper unit including at least a first ring element configured to engage an outer surface of the elongate object; and
- a support structure including at least one frame configured to support said gripper unit;

wherein the gripper unit is tiltable between a first position in which a plane including the at least first ring element is substantially vertical and a second position in which said plane is substantially horizontal;

wherein each of the at least first ring element is openable laterally in said first position of the gripper unit to receive said elongate object laterally from the skidding system in said first position of the gripper unit.

The at least first ring element may also be openable in the second and/or any other position, to release the elongate object in a vertical position after installation or in an emergency case.

The handling system according to the present inventing may also be referred to as elongate element handling system, or MP handling system or monopile handling system, in particularly in case the handling system is used on a vessel for handling monopiles to be installed in substantially vertical orientation in offshore locations, like offshore wind farms.

In particular, the handling system is configured to transfer an elongate object, such as a monopile foundation, from a storage location into an upending system, in particular on a vessel deck. The handling system comprises an upending system configured to upend said elongate object from a substantially horizontal position, in which position the elongate object is generally transported on sea, into a substantially vertical position allowing the elongate object to be lowered into the water. As an example, a gripper unit and an upending system are described in EP3517479B1. The handling system further comprises a skidding system configured to lift and skid said elongate object from a storage location into said upending system. Said storage location, in particular on a vessel deck, may for example include at least one pair of support cradles positioned at a distance of each other, for example on either side of a vessel, to support the elongate object during sea transport. Said at least one pair of support cradles can preferably be mounted fixedly on a vessel deck, or, alternatively, may be movable along one direction or even along two substantially transverse directions between different positions, for example to accommodate for various lengths of the elongate objects.

Said upending system comprises a gripper unit configured to receive and grip a first end of the elongate object, in particular an end which is configured to be driven into the seabed. The gripper unit includes at least first ring element configured to engage an outer surface of the elongate object. Thereto, an inner side of the at least first ring element can include a set of extendable roller elements to adjust to a diameter of the elongate object. The gripper unit further comprises a support structure including two substantially parallelogram-shaped frames configured to support said gripper unit. The at least first ring element may be positioned in between the two substantially parallelogram-shaped frames. The specific shape of the frames can allow the gripper unit to extend or protrude overboard. The gripper unit is tiltable between a first position in which a plane including the at least first ring element is substantially vertical and a second position in which said plane is substantially horizontal. In the first position, an elongate object gripped within the at least first ring element will therefore be in a substantially horizontal position, while said elongate object will have a substantially vertical position when the gripper unit is in the second position. The gripper unit is preferably positioned along a side of a vessel deck such that the at least first ring element is positioned overboard when the gripper unit is in the second position.

In an inventive way, each of the at least first ring element is openable laterally in said first position of the gripper unit to receive said elongate object laterally from the skidding system in said first position of the gripper unit. The lateral opening is in contrast to the prior art top side opening configured to receive the elongate object by lowering the elongate object down into the at least first ring element, either by a hoisting means or by a lifting assembly. A disadvantage of hoisting means for the transfer of an elongate object into the upending system is that it may be relatively difficult to control movements of the elongate object when it is suspended on the hoisting means. A lifting assembly configured to push up the elongate object from underneath may therefore be preferred. However, such a lifting assembly may need to be relatively large and bulky when the elongate object needs to be pushed up over a height of the at least first ring element of the gripper unit. A lateral opening is advantageous with respect to said prior art top opening in that a height of such opening is lower than for a top opening, which allows to reduce a size of the lifting assembly. At the same time, the elongate object may be skidded into the opening relatively easily.

According to some embodiments, the at least first ring element may include a single movable arm which is movable between a closed position of the at least first ring element and an open position of the at least first ring element.

The gripper unit is tiltable between a first position and a second position, and is tilted by rotating the gripper unit around an axis, hereinafter the tilting axis. Preferably this axis is parallel to the plane including the at least first ring element when said at least first ring element being in substantially vertical position. Hence a plane is defined by the tilting axis and the central axis of the at least first ring element.

The at least first ring element comprises a single movable arm and a fixed ring part, together defining the circumference of the at least first ring element. At one end, the single movable arm of the at least first ring element is openable, and as a consequence also closeable, thereby connecting to the fixed ring part, at a coupling point at one side of the single movable arm. At the opposite side of the single movable arm, the single movable arm is hingedly connected to the fixed ring part.

Preferably, the coupling point is positioned in an arc of the defined at least first ring element which arc is defined by a first radius under an angle of −10° and a second radius under an angle of 45°, wherein the radius at 0° being the radii defined by the intersection of the at least first ring element with the plane defined by the tilting axis and the central axis of the at least first ring element, the intersection being closest to the skidding system.

According to some embodiments, the support structure may be tiltable around a tilting axis, the at least first ring element includes a fixed ring part, the circumference of the at least first ring element being defined by the single movable arm and the fixed ring part, the least first ring element opens and closes by coupling and decoupling the single movable arm and the fixed ring part couple at a coupling point, the coupling point is positioned in an arc of the at least first ring element which arc is defined by a first radius under an angle of −10° and a second radius under an angle of 45°, wherein the radius at 0° being the radii defined by the intersection of the at least first ring element with the plane defined by the tilting axis and the central axis of the at least first ring element, the intersection being closest to the skidding system.

Hence the radius at 0° is oriented towards the side from which said elongate object is lifted and skidded from a storage location into said upending system.

According to some embodiments, the single movable arm may define a sector of at least 120° of the at least first ring element.

More preferred, the single movable arm defines a sector of between 120° and 190° of the at least first ring element, such as 180°. i.e. half of the circle defined by this at least first ring element. Most preferable it defines a sector of between 120° and 170°.

According to some embodiments, at the opposite side of the connecting point, the single movable arm may be hingedly connected to the fixed ring part at a hinging point, said hinging point is positioned in an arc of the at least first ring element which arc is defined by a first radius under an angle of 170° and a second radius under an angle of 200°.

According to some embodiments, the single movable arm may include a plurality of articulations.

Preferably 2 to 5 articulations are used, e.g. 2, 3, 4 or 5. Hence the arc of the at least first ring element defined by the single movable arm, is divided in a plurality of sub-arcs, one sub-arc more than the number of articulations. The width of the sub-arcs may be identical of may differ from one sub-arc to another sub-arc.

More preferably each sub-arc is defined by an angle, which angles may be all identical or may differ one from the other. As an example, in case of two sub-arcs, the angles each may be in the range of 40° to 60° of the circle. These two angles may be identical or may differ one from the other.

The advantage of using a plurality of articulations is that the single movable arm is not to rotate too far in order to open the upper side of the first ring element, as well as the side of the first ring element orientated towards the position of the skidding system. When the single movable arm with no articulations is to open to allow an elongate object lifted and skidded from a storage location into the upending system, the single movable arm is to rotate about 90°. Sufficient open space is needed adjacent the side of the first ring element to which the single movable arm is rotated. In fact, assuming the single movable arm provided half of the first ring element, to open the complete space above the fixed part of the first ring element, the complete single movable arm is to rotate 90° adjacent the hinge at the fixed part. Thus a space equal to the volume of the complete single movable arm has at least the width equal to half the diameter of the first ring element. When a plurality of articulation are provided, a space adjacent the fixes ring part having at least the width equal to the largest of the heights of the circle segments defined between the connection point and the adjacent first articulation, between two adjacent articulations and the last articulation and the hinge needs to be provided. As such space may be saved which is in particularly important when the handling system is provided as a part of a vessel, i.e. it saves deck space.

According to some embodiments, the gripper unit may further comprise a second ring element spaced apart from the first ring element.

This second ring element may be provided adjacent the first ring element in a position coaxially with this first ring element. The second ring element may be position more remote from the skidding system and/or more remote from the tilting axis of the upending system.

The first and second ring element may be substantially identical or may differ is size and/or functioning. Possibly, the second ring element has a diameter smaller than the first ring element. More preferably however, the first and second ring element have the same diameter, where at least the second ring element comprises, at the inner side of the at least second ring element, a set of extendable roller elements to adjust the diameter of the second ring element to the diameter of the elongate object. Possibly, both the first and the second ring element comprise, at their inner sides, a set of extendable roller elements to adjust the diameter of the first and the second ring element to the diameter of the elongate object. The first and second element may have an identical or a similar setup, i.e. an identical or a similar single movable arm, an identical or a similar number of articulations, the single movable arm of the second ring element may define the same or a similar arc, may have an identical or similar connection point and/or hinging point. When the handling system is used on a vessel to upend an elongate object, such as a monopile, the second element may provide the ring which is used to control the monopile motions induced by vessel and waves motions. The control is applied by grabbing the monopile and damping its motions.

According to some embodiments, the handling system may further comprise one or more supporting means to support the lower side of the elongate object. These one or more supporting means are provided more remote from the tilting axis of the upending system remote in the direction and sense parallel to the direction of elongation of the elongate object, towards the outer end of the elongate object opposite to the end to be gripped by the gripper unit. The one or more supporting means may comprise extendable roller elements to adjust to a diameter of the elongate object and/or saddles, optionally adjustable in position, to contact the elongate object.

As will be explained more in detail further, these one or more supporting means may function as vertical supports for elongate objects with a limited length. This in order to prove at least one support position of the elongate object during skidding and maneuvering of shorter elongate objects resting on carts of the skidding system, while not yet being in contact with the ring element or one of the ring elements.

According to some embodiments, at least one of said at least one frame of the support structure may be a movable frame comprising an extendible brace, said movable frame being movable between a first and a second configuration, the first configuration being a configuration with the extendible brace being in extended position in which the gripper unit is tiltable and the second configuration being a configuration with the extendible brace being in contracted position in which a height of said at least one of said at least one movable frame is reduced with respect to the first configuration. The extendible brace may extend in many different ways. The extendible brace may be a telescoping brace, or may be a foldable brace. The foldable brace, also referred to as articulating brace, comprises two or more brace parts which are mutually rotatable one to the other according to an axis substantially perpendicularly oriented to the axis of the brace.

According to some embodiments, the support structure may comprise at least two, optionally only two, frames, together configured to support said gripper unit.

According to some embodiments, each of the at least one frames may be a quadrilateral. According to some embodiments, each of the movable frames may be a quadrilateral, more preferably with the extendible brace in extended position being a substantially parallelogram-shaped frame. The extendible brace may be an articulating brace, the articulating brace in unfolded position being the extended brace and the articulating brace in folded position providing the contracted brace.

The quadrilateral frame may comprise four side beams and said extendible, possibly articulating brace. The quadrilateral frame comprises four corners, at least some of the corners, possibly all corners being hinged to enable the angle to change. There may be, with the extendible, possibly articulating brace in extended, like unfolded position, two mutually opposite acute angled corners and two mutually opposite obtuse angled corners. The extendible, possibly articulating, hence diagonal, brace connects the obtuse angled corners.

The quadrilateral frame is oriented substantially vertical, whereby one of the two acute angled corners is the upper acute angled corner, the other being the lower acute angled corner, and one of the two obtuse angled corners is the upper obtuse angled corner, the other being the lower obtuse angled corner.

The gripping unit is connected to the first, upper acute angled corner. At least one of the beams not coupled to the upper acute angled corner is an extendable, preferably telescopic, beam. Preferably this extendable beam couples the upper obtuse angled corner to the lower acute angled corner.

Starting from the frame with the articulating brace in unfolded position, when the extendible beam is increased (hence extended), the articulating brace remaining in unfolded position, the upper acute angled corner is pushed, in a direction of the beam connecting both lower corners, away from the lower acute angled corner and is brought downwards. To the extreme, the upper acute angled corner may become aligned with the two lower corners, all this while being connected to the gripping unit, which may rotate around an axis substantially perpendicularly to the plane defined by the frame at the first, upper acute angled corner.

The extendible brace may be brought in contracted position such the upper obtuse angled corner lowers in position. As such the frame comes in the second configuration, the height of the movable frame being reduced with respect to the first configuration. During the contraction of the extendable brace, the extendible beam may be reduced in length, hence contracted.

According to some embodiments, the extendible brace may be an articulating brace.

An articulating brace is also referred to as a foldable brace.

According to some other alternative embodiments, the at least one movable frame may include one or more of telescopic braces, cylinders, threaded rods and worm gear motors and alike.

According to some embodiments, the skidding system may include at least an outer cart and an inner cart movable between a storage location of the elongate object and the upending system in a direction transverse to a storage direction of the elongate object, wherein said outer cart and said inner cart are configured to push up the elongate object from the storage location.

According to some embodiments, the outer cart may be also movable in a direction in parallel with the elongate object when the elongate object is in the upending system.

The gripper unit may further be provided with two extendible arms substantially parallel with the elongate object to be, being or having been received in the gripper unit. The arms extend at two opposite sides of the gripper unit, and at the side of the gripper unit adjacent the ring elements and in a sense away from the first end of the elongate element. The outer end of each arm may be provided with a finger, which tips may move inwards and hence towards each other and possibly, even preferably being connect one to the other, in order to form a U-shaped movement limiting barrier, also referred to as stopper beam.

The outer cart being movable in a direction in parallel with the elongate object when the elongate object is in the upending system may ensure alignment with the upend stopper beam prior to start upending the elongate object. As such the risk that the elongate object not being in sufficient contact with the stopper beam is reduced, even taken away. If no such sufficient contact with the stopper beam is, the pile could slide and drop into the pile stopper beam during uprighting, causing high forces acting upon the upright and which may cause significant damage to the equipment.

The carts may comprise one or a plurality of pushing plates or pushing surfaces, also referred to as saddles, to contact the elongate object. The position of the pushing plates or pushing surfaces may be adjustable, in order to contact elongate objects having a different outer shape. The position of the pushing plates or pushing surfaces may be adjustable to, e.g., contact elongate cylindrical objects of different diameters.

Optionally, between the inner and outer cart, additional intermediate carts may be provided, each movable between a storage location of the elongate object and the upending system in a direction transverse to a storage direction of the elongate object, and configured to push up the elongate object from the storage location. Optionally one or more of these intermediate carts may also be movable in a direction in parallel with the elongate object when the elongate object is in the upending system.

The movement of the carts may be synchronized.

The handling system may be part of a vessel, the storage location and the upending system being located on the deck of the vessel. The storage location may be a storage location for storing piles, like monopiles, of offshore wind turbines.

The storage location may comprise a plurality of pairs of supports, each pair being adapted to receive and support one elongate object, like a pile, e.g. a monopile, of an offshore wind turbine. Each support may comprise one or more saddles to contact the elongate object.

Hence according to a second, independent aspect of the invention, the handling system according the first aspect of the invention may be used to upright piles, like monopiles of offshore wind turbines. The handling system according the first aspect of the invention may be used as a handling system on a vessel, which vessel is used to upright piles, like monopiles of offshore wind turbines.

According to a third, independent aspect of the invention, a handling system is provided, said a handling system for transferring an elongate object from a storage location into an upending system is provided, the handling system comprising:

- an upending system configured to upend said elongate object from a substantially horizontal position into a substantially vertical position;
- a skidding system configured to lift and skid said elongate object from a storage location into said upending system;

wherein said upending system comprises:

- a gripper unit configured to receive and grip a first end of the elongate object, the gripper unit including at least a first ring element configured to engage an outer surface of the elongate object; and
- a support structure including at least one frame configured to support said gripper unit;

wherein the gripper unit is tiltable between a first position in which a plane including the at least first ring element is substantially vertical and a second position in which said plane is substantially horizontal; and wherein at least one of said at least one frame of the support structure is a movable frame comprising an extendible brace, said movable frame being movable between a first and a second configuration, the first configuration being a configuration with the extendible brace being in extended position in which the gripper unit is tiltable and the second configuration being a configuration with the extendible brace being in contracted position in which a height of said at least one of said at least one movable frame is reduced with respect to the first configuration.

According to some embodiments, the support structure may comprise at least two frames, together configured to support said gripper unit.

Optionally support structure comprises only two frames. Preferably the frames are positioned one at each side of the gripper unit, the movable frame being the frame closest to the skidding system.

According to some embodiments, the movable frame may be located at the side of the gripper unit closest to the skidding system.

According to some embodiments, the extendible brace may be an articulating brace.

An articulating brace is also referred to as a foldable brace.

According to some other alternative embodiments, the at least one movable frame includes one or more of telescopic braces, cylinders, threaded rods and worm gear motors and alike. The articulating brace in unfolded position is the extended brace and the articulating brace in folded position is the contracted brace.

According to some embodiments, each of the at least one frames may be a quadrilateral.

According to some embodiments, the movable frames may be a quadrilateral.

When more than one frames are movable frames, these may possibly be identical quadrilaterals.

According to some embodiments, the movable frame with said extendible brace in extended position may be a substantially parallelogram-shaped frame.

According to some embodiments, the quadrilateral frame comprise four side beams and four corners, at least some of the corners, possibly all corners, may be hinged to enable the angle to change, said corners being two mutually opposite acute angled corners and two mutually opposite obtuse angled corners, the extendible brace connecting the obtuse angled corners.

According to some embodiments, the one or more frames may be oriented substantially vertical, for the at least one movable frame, one of the two acute angled corners is the upper acute angled corner, the other being the lower acute angled corner, and one of the two obtuse angled corners is the upper obtuse angled corner, the other being the lower obtuse angled corner.

According to some embodiments, the gripping unit may be connected to the first, upper acute angled corner.

Possibly, at least one of the beams not coupled to the upper acute angled corner may be an extendable beam.

According to some embodiments, at least one of the beams not coupled, hence free of direct coupling, to the upper acute angled corner may be an extendable beam coupling the upper obtuse angled corner to the lower acute angled corner.

The extendible beam may preferably be a telescopic beam.

Starting from the frame with the articulating brace in unfolded position, when the extendible beam is increased (hence extended), the articulating brace remaining in unfolded position, the upper acute angled corner is pushed, in a direction of the beam connecting both lower corners, away from the lower acute angled corner and is brought downwards. To the extreme, the upper acute angled corner may become aligned with the two lower corners, all this while being connected to the gripping unit, which may rotate around an axis substantially perpendicularly to the plane defined by the frame at the first, upper acute angled corner.

The extendible brace may be brought in contracted position such the upper obtuse angled corner lowers in position. As such the frame comes in the second configuration, the height of the movable frame being reduced with respect to the first configuration. During the contraction of the extendable brace, the extendible beam may be reduced in length, hence contracted.

According to some embodiments, each of the at least first ring element may be openable laterally in the first position of the gripper unit to receive said elongate object laterally from the skidding system in said first position of the gripper unit. The at least first ring element may include a single movable arm which is movable between a closed position of the at least first ring element and an open position of the at least first ring element.

The gripper unit is tiltable between a first position and a second position, and is tilted by rotating the gripper unit around a tilting axis. Preferably this axis is parallel to the plane including the at least first ring element when said at least first ring element being in substantially vertical position. Hence a plane is defined by the tilting axis and the central axis of the at least first ring element.

The at least first ring element comprises a single movable arm and a fixed ring part, together defining the circumference of the at least first ring element. At one end, the single movable arm of the at least first ring element is openable, and as a consequence also closeable, thereby connecting to the fixed ring part, at a coupling point at one side of the single movable arm. At the opposite side of the single movable arm, the single movable arm is hingedly connected to the fixed ring part.

Preferably, the coupling point is positioned in an arc of the defined at least first ring element which arc is defined by a first radius under an angle of −10° and a second radius under an angle of 45°, wherein the radius at 0° being the radii defined by the intersection of the at least first ring element with the plane defined by the tilting axis and the central axis of the at least first ring element, the intersection being closest to the skidding system.

Hence the radius at 0° is oriented towards the side from which said elongate object is lifted and skidded from a storage location into the upending system.

More preferably, the coupling point is positioned in an arc of the at least first ring element defined by a first radius under an angle of −10° and a second radius under an angle of 45°

According to some embodiments, the single movable arm may define a sector of at least 120° of the at least first ring element. More preferred, the single movable arm defines a sector of between 120° and 190° of the at least first ring element. Possibly it defines a sector of 180°, i.e. half of the circle defined by this at least first ring element. Most preferably it defines a sector of between 120° and 170°.

According to some embodiments, at the opposite side of the connecting point, the single movable arm may be hingedly connected to the fixed ring part at a hinging point, said hinging point is positioned in an arc of the at least first ring element which arc is defined by a first radius under an angle of 170° and a second radius under an angle of 200°.

Possibly, the single movable arm includes a plurality of articulations. Preferably 2 to 5 articulations are used, e.g. 2, 3, 4 or 5. Hence the arc of the at least first ring element defined by the single movable arm, is divided in a plurality of sub-arcs, one sub-arc more than the number of articulations. The width of the sub-arcs may be identical of may differ from one sub-arc to another sub-arc.

More preferably each sub-arc is defined by an angle in the range of 40° to 60°.

The advantage of using a plurality of articulations is that the single movable arm is not to rotate too far in order to open the upper side of the first ring element, as well as the side of the first ring element orientated towards the position of the skidding system. When the single movable arm with no articulations is to open to allow an elongate object lifted and skidded from a storage location into the upending system, the single movable arm is to rotate about 90°. Sufficient open space is needed adjacent the side of the first ring element to which the single movable arm is rotated. In fact, assuming the single movable arm provided half of the first ring element, to open the complete space above the fixed part of the first ring element, the complete single movable arm is to rotate 90° adjacent the hinge at the fixed part. Thus a space equal to the volume of the complete single movable arm has at least the width equal to half the diameter of the first ring element. When a plurality of articulation are provided, a space adjacent the fixes ring part having at least the width equal to the largest of the heights of the circle segments defined between the connection point and the adjacent first articulation, between two adjacent articulations and the last articulation and the hinge needs to be provided. As such space may be saved which is in particularly important when the handling system is provided as a part of a vessel, i.e. it saves deck space.

According to some embodiments, the gripper unit further may comprise a second ring element spaced apart from the first ring element. This second ring element may be provided adjacent the first ring element in a position coaxially with this first ring element. The second ring element may be position more remote from the skidding system and/or more remote from the tilting axis of the upending system.

The first and second ring element may be substantially identical or may differ is size and/or functioning. More preferably the second ring element has a diameter smaller than the first ring element.

The first and second element may have an identical or a similar setup, i.e. an identical or a similar single movable arm, an identical or a similar number of articulations, the single movable arm of the second ring element may define the same or a similar arc, may have an identical or similar connection point and/or hinging point, According to some embodiments, said handling system may be a handling system according to the first aspect of the invention.

According to embodiments of the handling system according to the first and or third aspect of the invention, the upending system further may comprise an outrigger adapted to be coupled to an outer end of the elongate object. This outrigger may be adapted to fold down to create clearance for the elongate object, like a monopile, to shift from storage position to the upending line. According to a first type of possible embodiments, the outrigger is adapted to be moved in a direction perpendicular to the longitudinal direction of the outrigger. This may be done using hydraulic or pneumatic means, mechanical lifting means, and alike. The outrigger may be coupled to e.g. the deck or any other part of a vessel, by means a polygonal, e.g. substantially parallelogram-shaped frame having hinging angles allowing to adjust the height of the polygonal.

According to a second type of possible embodiments, which optionally even may be combined with the features of the first type of embodiments, the service elements of the outrigger may be adapted to fold down. The outrigger as is e.g. described in EP3827149A1, is typically provided with an elongate frame which serves to support service elements. The elongate frame is substantially parallel to the surface the outrigger is coupled to, e.g. the deck of a vessel. On the elongate frame, a moveable platform is provided, moveable in the longitudinal direction of the elongate frame, e.g. by means of a rial system. On the moveable platform, a receiving means is provided for receiving a coupling tool, adapted to be coupled to the outer end of an elongate object to set upright, while this elongate object is in a position substantially parallel to the longitudinal direction of the elongate frame. Also such coupling tools are described in EP3827149A1, whose content is hereby incorporated by reference. as an example the coupling element may comprise a number of extendible arms with clamps at their first outer end, and all oriented outwards from a central point where the second outer ends of the arms are in a fixed position relative to each other. The arms are mounted inside a tubular frame, which is provided with two studs oriented outwards the tubular frame, the two studs and the center point of the tubular frame being colinear. This coupling tool may be lifted by a lifting means, like a crane, and brought into and out of the other parts of the outrigger.

The receiving means may comprise two beams upright to the movable platform, each at the upper end provided with dovetail shaped receiving elements or forks, adapted to receive one of the studs of the coupling tool. In a sense outwards of the elongate frame. The dovetail shaped receiving elements or forks may be adjustable in height. The movable platform may further comprise a guiding tool or guiding means, being a usually robust element, block or plate with which the coupling tool may be brought in contact before the studs are sunken towards and into the dovetail shaped receiving elements.

The coupling tool may be coupled to the outer end of the elongate object, and possibly lifted by a hoisting means, such as a crane. The crane may comprise a base on which a jib is mounted. The jib may hoist the outrigger by its hoisting ropes coupled to the outrigger by a hook or alike. This, in combination with the other actions of the upending system, may rotate the elongate object.

Further, on the movable platform itself, a further contact element may be provided, also referred to as constraint, e.g. sway constraint. This contact element itself is movable on the movable platform in a direction parallel to the longitudinal direction of the elongate frame, and preferably at least over a part of the movable platform before the receiving means in a direction outwards the outrigger, i.e. at the opposite side of the receiving means in view of the guiding tool.

These two upright beams provided with forks, the contacting means and the constraint may be adapted to fold down, i.e. to be lowered or rotated towards the upper side of the elongate frame, to create clearance for the elongate object when being skid into the upending system.

This constraint may be used to contact, even to move in the direction parallel to the longitudinal direction of the elongate frame, an elongate object to be set upright. The constraint may push the elongate object into and/or through ring elements of the upending system. The dimensions of the constraint are preferably chosen such that the constraint can continue making contact with the outer end of the elongate object, while the coupling tool is positioned and coupled to the same outer end of the elongate object.

Possibly, the constraint may even be provided with one or more clamps to clamp the outer end of the elongate object. As such the elongate object may be moved in the two senses into and through, and out of and through, the ring elements of the upending system.

As will be described in detail further, when an elongate object is positioned in the one or more ring elements of the upright, the elongate object may not be in a stable position. E.g. the upright being positioned on a vessel, the vessel making swaying, rolling and/or pitching movements, the elongate object may tend to move in the swaying direction. The elongate object, still being in a horizontal position on the vessel deck, but being firmly gripped in the upright system, may be clamped between the ring element or elements on one side of the elongate object, and the constraint on the opposite end of the elongate object pushing the elongate object towards the ring element or elements. As such the elongate object is firmly positioned in spite of the vessel movements.

Hence a method to erect or upright an elongate object using this outrigger, may comprise the steps, optionally in combination with other steps according to one or more aspects of this invention,

- providing the upending system in a position to receive an elongate object, e.g. including positioning the gripper tool being part of a handling system according to the first aspect of the invention in a first position, and/or bringing an extendable brace of a handling system according to the second aspect of the invention;
- skidding an elongate object into the gripper tool;
- contacting and possibly moving and clamping the elongate object in a direction parallel the elongate direction of the elongate object using the constraint being moved on the movable platform;
- providing the upending system in a position fixing an elongate object;

providing a coupling tool in receiving means of the outrigger;

moving the coupling tool in receiving means towards the outer end of the elongate object to contact the coupling tool to this outer end;

coupling the coupling tool to this outer end;

disconnecting the constraint from this outer end by moving the constraint on the movable platform;

upright an elongate object by hoisting the outer end of the elongate object by means of a hoisting means connected to the coupling tool.

Alternatively or additionally, at least one cart system is provided to displace an outrigger, to couple the outrigger to the second end of the elongate objects positioned in the upending system and adjust the position of the elongate object in the open first ring element by moving the coupled outrigger in a sense from the second to the first end of the elongate object. Such provision of this at least one cart system is beneficial and allows the handling of elongate objects of various lengths, such as in the range of 50 m to 150 m, by the same handling system.

When an elongate object is lifted and positioned in the gripper unit, the outrigger, coupled to the second outer end of the elongate object opposite to the first end, may be used to push the elongate object in the upending system in a direction parallel to the axis of the elongate object, and in a sense from the second to the first end.

If an inner and outer cart is provided, this action may take place simultaneously with the outer cart moved in a direction in parallel with the elongate object when the elongate object is in the upending system.

According to embodiments of the handling system according to the first and or third aspect of the invention, the gripper unit may further be provided with two extendible arms substantially parallel with the elongate object to be, being or having been received in the gripper unit. The arms extend at two opposite sides of the gripper unit, and at the side of the gripper unit adjacent the ring elements and in a sense away from the first end of the elongate element. The outer end of each arm may be provided with a finger, which tips may move inwards and hence towards each other and possibly, even preferably being connect one to the other, in order to form a U-shaped movement limiting barrier. As an example, the outer end of each arm may be provided with a hinged finger, which tips may rotate inwards and hence towards each other and possibly, even preferably being connect one to the other, in order to form a U-shaped movement limiting barrier. A connection is preferred as this provides a stiff and rigid structure reducing the motions of the elongate object, such as a monopile, during upending. When an elongate object is lifted and positioned in the gripper unit, and the elongate object is pushed in the upending system in a direction parallel to the axis of the elongate object, and in a sense from the second to the first end, the first end of the elongate object may be brought in contact with the two, preferably coupled, fingers. As such the movement of the elongate object in a sense from the second to the first end is blocked when the first end of the elongate object contacts the two inwards rotated and positioned fingers.

The handling system according to the third aspect may be part of a vessel, the storage location and the upending system being located on the deck of the vessel. The storage location may be a storage location for storing piles, like monopiles, of offshore wind turbines.

According to a fourth, independent aspect of the invention, a handling system for transferring an elongate object from a storage location into an upending system is provided. This handling system comprising an upending system configured to upend said elongate object from a substantially horizontal position into a substantially vertical position, the upending system comprises:

a gripper unit configured to receive and grip a first end of the elongate object; and a support structure including at least one frame configured to support said gripper unit, the gripper unit being in tiltable connection to a first end of a moveable beam of the support unit, the gripper unit being tiltable around a tilting axis between a first position in which the plane defined by the tilting axis and the longitudinal axis of the gripper unit is substantially vertical and a second position in which said plane is substantially horizontal, said moveable beam being rotational around a first axis at the second end of the moveable beam.

The tilting is controlled by means of a movable multi-bar system. A movable multi-bar system comprises a plurality of bars, the position of some or all bars may be movable in view of the other bars of the multi-bar system. This movable multi-bar system preferably comprises at least one extendable bar. The extendible bar or bars may extend in many different ways. The extendible bar or bars may be telescoping bars, or may be a foldable bars. The foldable bars, also referred to as articulating bars, comprises two or more bar-parts which are mutually rotatable one to the other according to an axis substantially perpendicularly oriented to the axis of the bar.

The movable multi-bar system preferably comprises at least a first, a second, a third and a fourth bar, wherein:

said first and said second bar, preferably by their first ends, each are individually freely rotatably connected to said moveable beam at the same side in view of the tilting axis, the first bar being connected to the moveable beam at a first position closer to the tilting axis as compares to the second position at which the second bar is connected to the moveable beam the second end of the first bar being freely rotatably connected to a first point on the third bar;

the second end of the second bar being freely rotatably connected to a second point on the third bar;

first and second point on the third bar and the two connection points of the first and second bar to the moveable beam form the angles of a convex quadrilateral;

the fourth bar being at its first end freely rotatably connected to the first point on the third bar, the second end of the fourth bar being connected to the gripper unit, the second bar being an extendible bar;

the connection point of the fourth bar to the gripper unit and the first and second position on the moveable beam are at the same side of the plane defined by the tilting axis and the longitudinal axis of the gripping unit; and the connection point of the fourth bar to the gripper unit on the one hand, and the first and second position on the moveable beam at the other hand, are at a different side of the plane defined by the tilting axis and being perpendicular to the longitudinal axis of the gripping unit.

Possibly, even preferably, the movable multi-bar system is a four-bar system, thus a movable four-bar system.

This movable multi-bar system, possibly a four bar system mounted to the gripping unit and the support system, has the advantage that it allows to control the orientation of the gripping unit independently of the rotation of the moveable beam over its axis of rotation.

When the gripping unit is in its first position, the second beam being in extended position, the gripping unit is in an orientation adapted to receive an elongate object in said first orientation. In case the beam rotates around its axis at its second end; by keeping the second beam extended, the gipping unit is taken along trough this rotation by the tilting axis. Due to the unchanged position of the movable multi-bar system, such as the movable four bar system, the orientation of the gripping unit will not change, and the orientation remains adapted to receive an elongate object in this first orientation.

Only by retracting the second bar, i.e. reducing its length, the four bar system will tilt the gripping unit, changing the orientation of the gripping unit to its second orientation. This independent a rotational movement, or a standstill, of the moveable beam around its axis of rotation.

This has the advantage that the orientation of the gripping unit may be controlled independently the position of the moveable beam.

When this handling system is combined with the features of a handling system according to the third aspect of the invention, thereby providing a handling system according a fifth aspect of the invention, the moveable beam being a beam of movable frame comprising an extendable brace, which is in extended position a quadrilateral, preferably substantially parallelogram-shaped frame, the orientation of the gripping unit can be controlled independent the movement of the movable frame.

In particularly, when

- the quadrilateral frame comprises four side beams and four corners, at least some of the corners, possibly all corners, being hinged to enable the angle to change, said corners being two mutually opposite acute angled corners and two mutually opposite obtuse angled corners, and the extendible brace connecting the obtuse angled corners; and
- the movable frame oriented substantially vertical;
- for the movable frame, one of the two acute angled corners is the upper acute angled corner, the other being the lower acute angled corner, and one of the two obtuse angled corners is the upper obtuse angled corner, the other being the lower obtuse angled corner; and
- the gripping unit being connected to the first, upper acute angled corner, the tilting axis begin defined by this upper acute angled corner;
- the moveable beam of the support system is the beam connecting this upper acute angled corner with the lower obtuse angled corner;
- at least one of the beams of the frame, which beam is not coupled to the upper acute angled corner, is an extendable, preferably telescopic, beam (preferably this extendable beam couples the upper obtuse angled corner to the lower acute angled corner);

the support structure can be brought in a position with its extendable beam in extended position. while the gripping unit's orientation is adapted to receive an elongate object being positioned in substantially horizontal direction. In this position, the extendable brace may be brought in its retracted form, Keeping the gripping unit and the extendable brace in these positions, an elongate object may be maneuvered such it is in line with the gripping unit. By extending the extubate brace, and retracting the extendable beam, the gripping unit is repositioned and moved upwards and towards the elongate object, and possibly even bringing the lower end of the elongate object in the gripping unit, e.g. in one or more opening elements, without the need to reorient the gripping unit. By keeping the movable multi-bar system, like a four bar system, unchanged, the orientation of his gripping unit will not change while the moveable beam moves, i.e. rotates, due to the retraction of the extendible beam. The gripping unit will grip over the elongate objects outer end.

Further maneuvering the elongate object into the gripping unit, as will be explained further, which may include displacing the elongate object into the gripping unit by a translation of the elongate object in the direction of elongation of this object, may bring the elongate object in a position fit to be erected, hence being tilted. After firmly gripping the elongate object, the movable multi-bar system, e.g. the four bar system, may be used to bring the gripping unit from its first position into its second position, thereby tilting the elongate object. Extending the extendable beam again, will move the gripping unit sideways by a rotation of the movable beam. However, as the movable multi-bar system, such as a four bar system, will be kept unchanged, the gripping unit will keep the elongate object in upright orientation.

According now to a sixth aspect of the invention, the handling system according the third and/or fifth aspect of the invention may be used to upright piles, like monopiles of offshore wind turbines. The handling system according the third or fifth aspect of the invention may be used as a on a vessel, which vessel is used to upright piles, like monopiles of offshore wind turbines.

This handling system according the first and/or third and/or fifth aspect of the invention is used as a handling system on a vessel, which vessel is adapted to transport and upright piles, like monopiles, of offshore wind turbines.

Any or all of the features of the first and second aspect of the invention may be combined with any or all the features of the third, fourth, fifth and/or sixth aspect of the invention.

According to a seventh aspect of the invention, a vessel is provided. The vessel comprises a vessel deck including:

- a handling system according to any aspect of the present invention;
- a storage system including at least one storage location configured to store an elongate object.

Possibly a plurality of storage locations are provided, each configured to store an elongate object, like a pile, such as a monopile, of offshore wind turbines.

The vessel may comprise at least one crane to hoist and displace an outrigger adapted to be coupled to the second end of the elongate objects positioned in the upending system.

The vessel may comprise at least one cart system to displace an outrigger to couple the outrigger to the second end of the elongate objects positioned in the upending system and adjust the position of the elongate object in the open first ring element by moving the coupled outrigger in a sense from the second to the first end of the elongate object.

The storage location may comprise a plurality of pairs of supports, each pair being adapted to receive and support one elongate object, like a pile, e.g. a monopile, of an offshore wind turbine. Each support may comprise one or more saddles to contact the elongate object. For each pair of supports, one support may be provided at port side of the vessel, the other being provided at starboard side of the vessel, both being provided at the same position in longitudinal direction of the vessel. The carts of the skidding system may be moveable in longitudinal direction of the vessel between each pair of supports in the storage location.

Any or all of the features of the first, second, third, fourth, fifth and/or sixth aspect of the invention may be combined with this seventh aspect of the invention.

According to a further eighth aspect of the invention, a handling system is provided which comprises a skidding system. The skidding system includes at least an outer cart and an inner cart movable between a storage location of the elongate object and an upending system for erecting an elongate object in a direction transverse to a storage direction of the elongate object. The outer cart and the inner cart are configured to push up the elongate object from the storage location. The outer cart and the inner cart are configured to move the elongate object in a direction transverse to the storage direction of the elongate object and transverse to the lifting direction. The outer cart is also movable in a direction in parallel with the elongate object when the elongate object is in the upending system. Such storage location is, as a mere example, described in EP3650686B1.

Any or all of the features of the first, second, third, fourth, fifth, sixth and/or seventh aspect of the invention may be combined with this eighth aspect of the invention.

According to a further ninth aspect of the invention, a method for transferring an elongate object from a storage location into an upending system, in particular on a vessel deck is provided.

This method for transferring an elongate object from a storage location into an upending system, in particular on a vessel deck comprises the steps of A. providing a handling system according to any of the aspects of the invention wherein the skidding system includes at least an outer cart and an inner cart movable between a storage location of the elongate object and the upending system in a direction transverse to a storage direction of the elongate object, wherein said outer cart and said inner cart are configured to push up the elongate object from the storage location, the outer cart is also movable in a direction in parallel with the elongate object when the elongate object is in the upending system;

B. bringing the gripper unit in the first position (A);

C. move said movable frame to the second configuration;

D. opening the at least first ring element;

E. when further ring elements are provided in the gripper unit, opening all other ring elements;

F. moving one elongate object by said at least inner and outer cart in a direction transverse to said elongate object from the storage location of the elongate object to the upending system;

G. move said movable frame to the first configuration;

H. disconnect the inner cart from the elongate object and retract the inner cart back towards the storage location;

I. move the outer cart in a direction in parallel with the elongate object when the elongate object is in the upending system to adjust the position of the elongate object in the open first ring element;

J. close the first ring element, and when further ring elements are provided in the gripper unit, close all other ring elements and disconnect the outer cart from the elongate object and retract the outer cart back towards the storage location.

According to some embodiments, the skidding system of the handling system may be the skidding system of a handling system according to the eight aspect of the invention.

In case additional intermediate carts are part of the skidding system, these intermediate carts, positioned between the inner and outer cart, may be disconnected from the elongate object when the inner cart is disconnected from the elongate object. The intermediate carts may also be retracted prior to the performance of step I. The intermediate carts may function synchronically with the inner chart.

It is understood while the steps are mentioned in sequence, some steps may be performed partially synchronously to safeguard some time.

As an example, in step J the disconnection of the outer cart may happen prior to the closing of the first and optionally other ring elements.

This step J may further comprise the coupling of an outrigger to the second end of the elongate object and optionally adjust the position of the elongate object in the open first ring element by moving the coupled outrigger in a sense from the second to the first end of the elongate object.

As an example, step J may comprise the steps:

J1.—disconnect the outer cart from the elongate object and retract the outer cart back towards the storage location.

J2.—coupling of an outrigger to the second end of the elongate object and optionally adjust the position of the elongate object in the open first ring element by moving the coupled outrigger in a sense from the second to the first end of the elongate object.

J3.—close the first ring element, and when further ring elements are provided in the gripper unit, close all other ring elements and disconnect the outer cart from the elongate object and retract the outer cart back towards the storage location.

Hence a method for transferring an elongate object from a storage location into an upending system is provided, wherein step J comprises:

J1.—disconnect the outer cart from the elongate object and retract the outer cart back towards the storage location;

J2.—coupling of an outrigger to the second end of the elongate object and optionally adjust the position of the elongate object in the open first ring element by moving the coupled outrigger in a sense from the second to the first end of the elongate object;

J3.—close the first ring element, and when further ring elements are provided in the gripper unit, close all other ring elements and disconnect the outer cart from the elongate object and retract the outer cart back towards the storage location.

In particularly in case the elongate objects are relatively short, the step H may further comprise to provide and support the elongate object on one or more supporting means to support the lower side of the elongate object being provided more remote from the tilting axis of the upending system in view of the ring elements.

These one or more supporting means may function as vertical supports for elongate objects during skidding and maneuvering of shorter elongate objects resting on carts of the skidding system, while not yet being in contact with the ring element or one of the ring elements.

While disconnecting the elongate object from the inner cart, the elongate objects lower side may be rested on these one or more supporting means. As such, the elongate object is supported by these one or more supporting means and the outer card. When step I is performed, the elongate object moves over, e.g. rolls on the rollers, of this or these one or more supporting means in order to bring the elongate object in contact with, and move in and through the open ring element or elements.

The upending may be configured such that during step G, one or more opened ring elements of the upending move in a direction in parallel with the elongate object, optionally even thereby moving the first outer end in some or all of the opened ring elements. Hence a method for transferring an elongate object from a storage location into an upending system is provided, wherein during step G, one or more opened ring elements of the upending move in a direction in parallel with the elongate object.

According to some embodiments, during step G, one or more opened ring elements of the upending may move in a direction in parallel with the elongate object thereby moving the first outer end in some or all of the opened ring elements.

Any or all of the features of the first, second, third, fourth, fifth, sixth, seventh and/or eighth aspect of the invention may be combined with this ninth aspect of the invention, more in general, it is clear that any or all features of one of the aspects of the invention may be combined with one, more or all features of one, some or all the other aspects of the invention.

Figure 1:
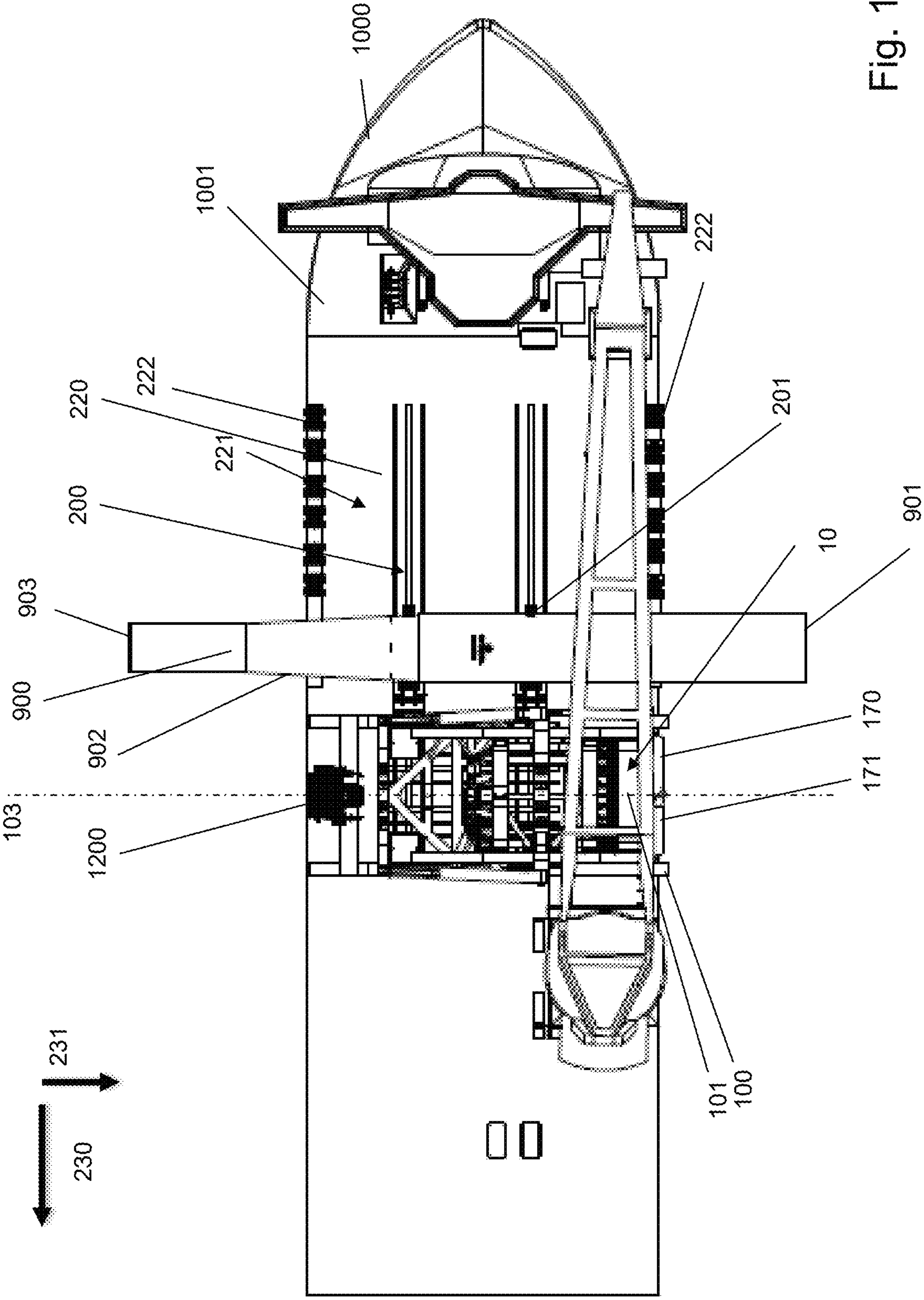
FIGS. 1 to 6 show a top view of a vessel comprising a handling system according to the invention, disclosing several steps of this handling system in its action to upright a relatively large monopile.

In the different figures, the same references refer to the same or a similar feature.

DETAILED DESCRIPTION OF EMBODIMENT(S)

FIGS. 1 to 17, and 24 to 29 show a vessel 1000 on which deck 1001 a handling system 10 according to several aspects of the invention is present. The vessel 1000 is a vessel fit for upending monopiles 900 (hereinafter MP) of diverse lengths, which are to be placed vertically on a foundation on the seabed. The MP's 900 are positioned in horizontal direction extending over the deck 1001 with their axis 103 perpendicularly to the direction of the hull of the vessel 1000.

The MP's 900 are supported at a storage location 220 on a storage system 221. The storage location 220 is located on the front part of the ship and comprises a plurality of pairs of supports 222, each pair being adapted to receive and support one MP 900. One of the pairs is provided at the side of the ship on starboard side, the other at the side of the ship on port side. Each support may comprise two or more saddles to contact the surface 902 of the MP 900 and to keep the MP 900 in place during transport. Between the supports on starboard side and the supports on port side, the deck 1001 is substantially obstacle free.

To bring the MP's 900 from the storage location 220 to the upending system 100 and its gripper unit 101, the handling system comprises at least two, in this embodiment two carts being part of the skidding system 200. The inner cart 201 is the cart closest to the gripper unit 101, the outer cart 202 is the cart most remote to the gripper unit 101 and closer to the outrigger 1200. The inner and outer cart are fit to travel under the MP's 900, to lift one MP from its supports 222 and move the MP 900 in a direction 230 towards the upending system 200 in lifted position. The inner and outer cart can lift and move on the deck 1001 synchronously to make this movement possible.

The upending system 100 comprises a gripping or gripper unit 101. The gripper unit 101 is positioned along a side of a vessel deck 1001 such that a first ring element 110 may be positioned overboard.

The gripper unit 101 comprises in this embodiment two coaxial ring elements, being the first ring element 110 and a second ring element 120, the second ring element 120 being positioned closest to the X-axis of the vessel 1000. The first ring element 110 has a fixed ring part 112, providing just over half of the ring circumference, and a second part being a moveable arm 111. The two parts are hingingly connected at a hinging point 114 and may couple at the coupling point 113. The single movable arm may hence form a closed ring with the fixed part when being connected at the hinging point 114 and the coupling point 113, or may provide an open ring, with the movable arm 111 rotated over about 120° at the hinging point 114. The hinging point 114 is position at about the height of the central axis of g the gripper unit and closer towards the stern of the vessel, the coupling point 113 is about opposite to this hinging point 114 and closer to the fore of the vessel.

The second ring element has similar parts and is substantially identical to the first ring element in its movements, however, the movable arm 111 comprises two segments, which are hingingly connected and each provide half of the segment of the movable arm 111.

The ring elements 110 and 120 comprise extendable roller elements to adjust the inner diameter of the ring element to the diameter of the MP 900 to be gripped.

At a position further outboard the first ring element 110, the gripper unit 101 comprises two extendible arms 170 substantially parallel with the MP 900, being or having been received in the gripper unit. The arms 170 extend at two opposite sides of the gripper unit 101, and at the side of the gripper unit adjacent the ring elements 110 and 1220 and in a sense 231 away from the first end of the MP 900. The outer end of each arm 170 are provided with a finger 171, whose tips move inwards and hence towards each other and can connect one to the other, in order to form a U-shaped movement limiting barrier.

At a position further onboard in view of the second ring element 120, the handling system comprise a supporting means 180 to support the lower side of the MP 900. This supporting means comprises also extendable roller elements to adjust to a diameter of the MP 900 and/or saddles, optionally adjustable in position, to contact the MP 900.

The gripper unit 101 further comprises a support structure 150 including two substantially parallelogram-shaped frames 151 and 161 configured to support said gripper unit 101 on the vessel deck 1001. The ring elements 110 and 120 are positioned in between the two substantially parallelogram-shaped frames. The specific shape of the frames 151 and 161 can allow the gripper unit 101 to extend or protrude overboard. The gripper unit 101 is tiltable around a tilting axis 102 between a first position in which a plane including the ring element is substantially vertical and a second position in which said plane is substantially horizontal. The gripper unit is positioned along a side of a vessel deck 1001 such that the first and second ring elements are positioned overboard when the gripper unit 101 is in the second position.

Figure 18:
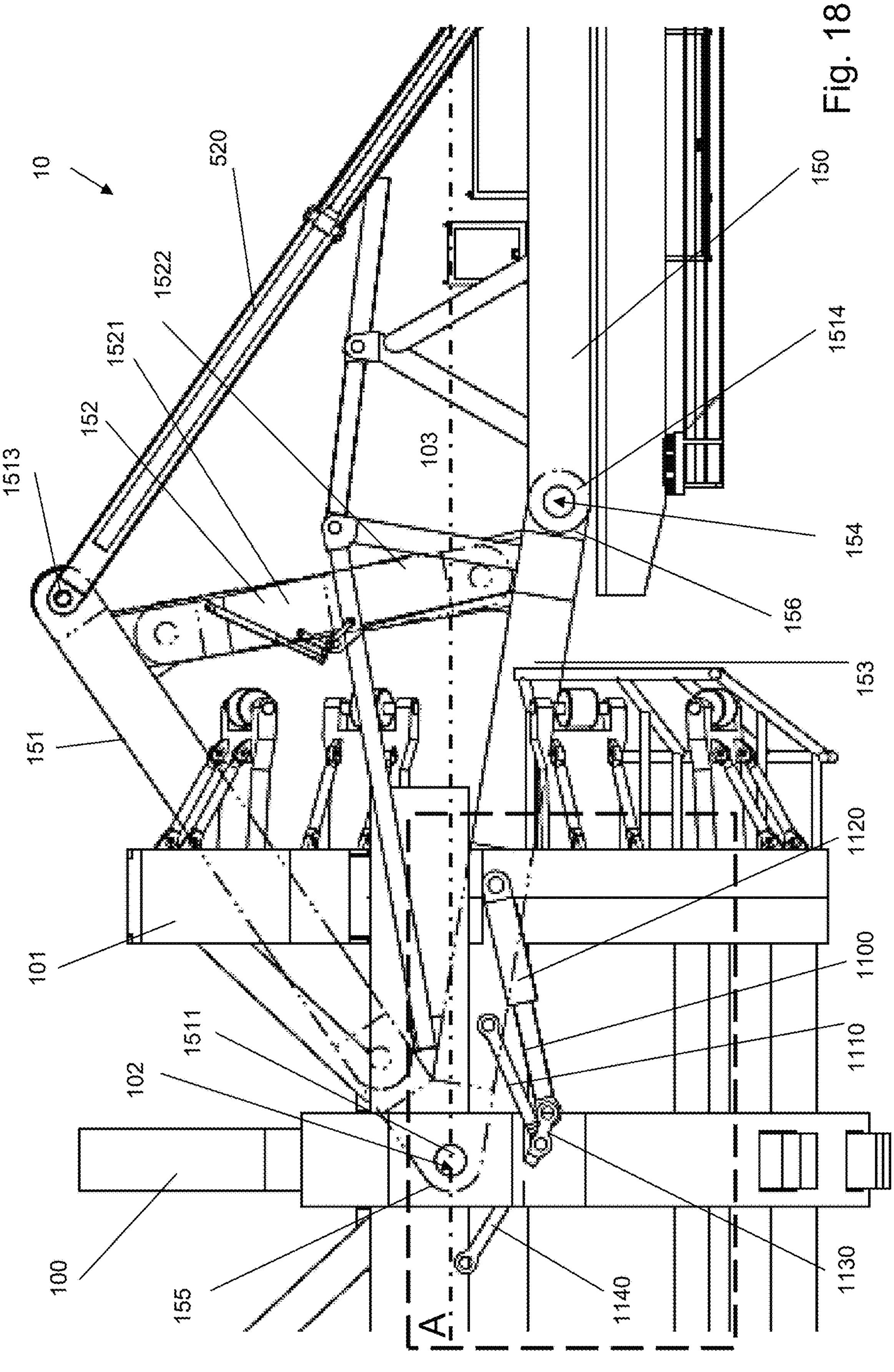
FIGS. 18 to 22 show a schematically view of a supporting frame supporting a gripper unit, both being part of the handling system of the FIGS. 1 to 17, and this in various positions during loading the gripping unit with a monopile, and uprighting this monopile.

As show in the FIGS. 18 and 19 to 22, the parallelogram-shaped frames is a movable frame 151. The movable frame 151 comprises an extendible brace 152, which is movable between a first and a second configuration. In the first configuration the extendible brace being in extended position, as shown in FIG. 18.

Figure 19:
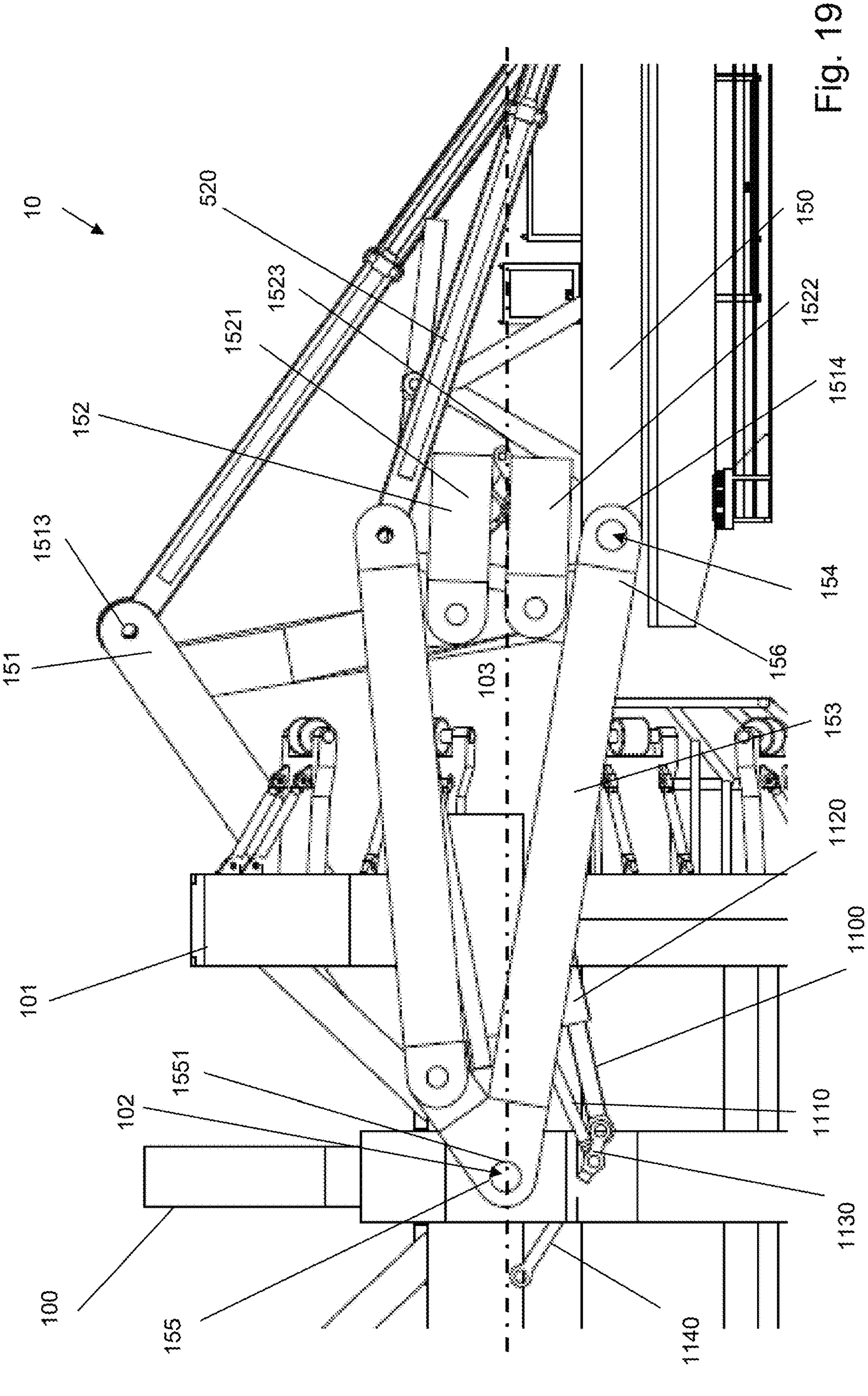

In the second configuration, shown in FIG. 19, the extendible brace 152 is in contracted position in which a height of the movable frame 151 is reduced with respect to the first configuration. In this embodiment the extendable brace 152 is an articulating or foldable brace comprising two parts 1521 and 1522 which hinge at an axis 1523. Alternatives are telescoping braces.

The movable frame 151 is a quadrilateral frame comprising four side beams and the extendible, articulating brace 152. The frame comprises four corners, all being hinged to enable the angle of the corner to change. There may be, with the extendible, articulating brace in extended position as shown in FIG. 18, two mutually opposite acute angled corners and two mutually opposite obtuse angled corners. The extendible articulating, hence diagonal, brace connects the obtuse angled corners. The movable frame 151 is oriented substantially vertical, whereby one of the two acute angled corners is the upper acute angled corner 1511, the other being the lower acute angled corner, and one of the two obtuse angled corners is the upper obtuse angled corner, the other being the lower obtuse angled corner.

The gripping unit 101 is connected to the first, upper acute angled corner 1511. The beam 520, not coupled to the upper acute angled corner 1511, is an extendable telescopic beam 520, coupling the upper obtuse angled corner 1513 to the lower acute angled corner.

Figure 20:
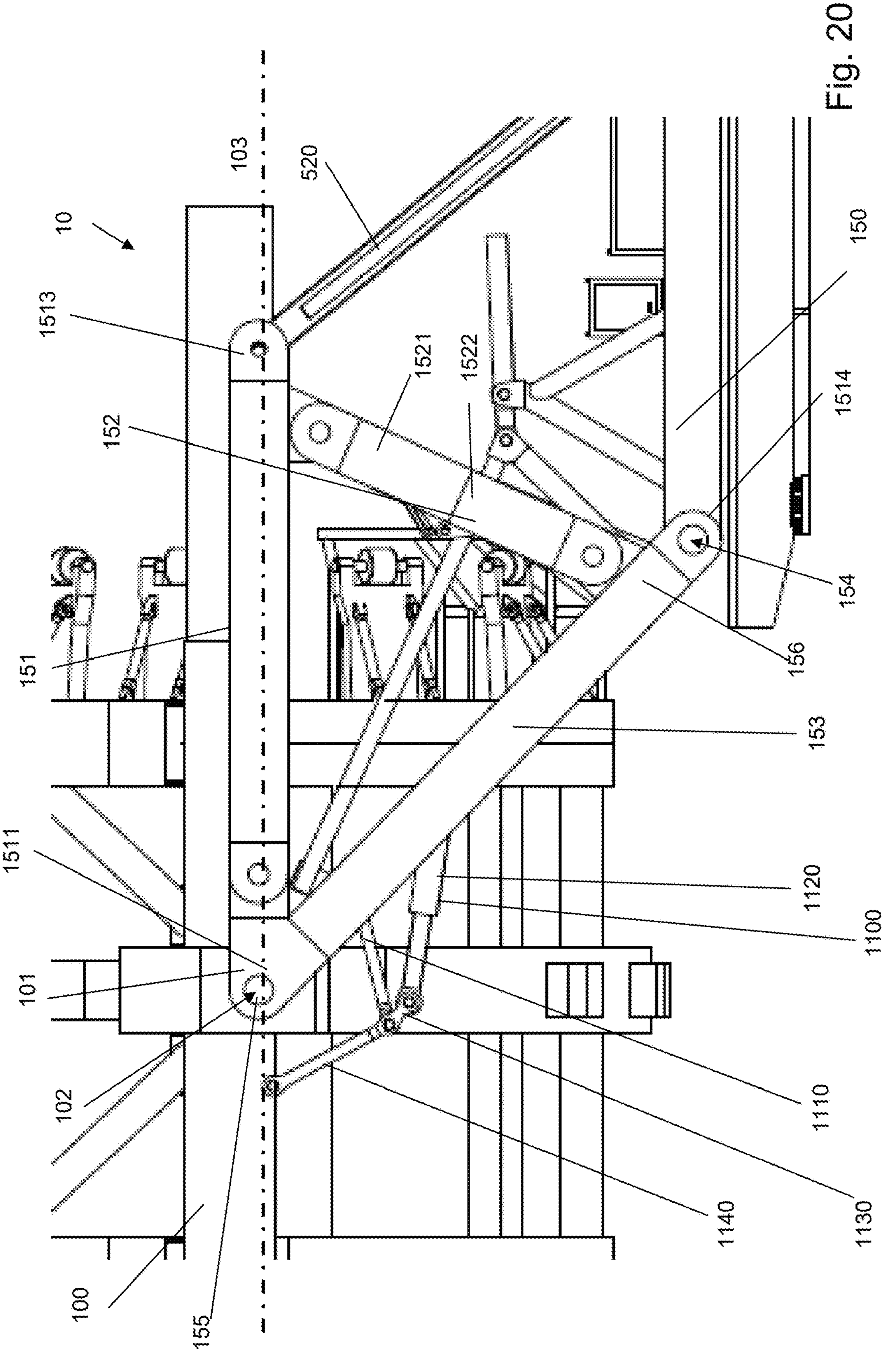

The possibility this moveable frame 151 provides, is shown in FIGS. 18 to 20. Starting from the position shown in FIG. 18, the griping unit is poisoned most outwards the vessel deck in its lower position, with the movable frame 151 in retracted position. The extendible beam 520 is extended as well. The two ring elements 110 and 120 may be in opened position. When the MP 900 is now to be brought in coaxial position with the ring elements, the skidding system is to move the MP towards the ripping unit in a direction from the fore to the stern of the vessel, i.e. in X-axis direction backwards. If the frame 151 were not movable, the MP is to be lifted over the upper obtuse angel 1513 of the frame 151.

By providing the extendable brace 152 and bringing it in the retracted position, optionally reducing the length of the extendible beam 520, i.e. from the situation shown in FIG. 18 to the one shown in FIG. 19, the upper obtuse angled corner 1513 is lowered, while the gripping unit 101 stays motionless in its lower position. The carts must lift the MP to a lower extend, which is safer when manipulating an MP on board of a vessel floating on the sea. As can be seen in FIG. 19, the second frame 161 is not necessarily to be lowered, as the MP is not to be moved so far in X-axis direction backwards. By bringing the extendable brace 152 in the extended position, possibly extending the beam 520, and thus bringing the frame 151 again in the position shown in FIG. 18, the MP is parallel with the axis of the gripping unit 101 between the two frames 151 and 161.

By retracting the extendable beam 520 of the frame 151, and having the frame 161 main the same movement, the gripper unit is brought in a higher position, but the gripping unit remaining in the same orientation, as shown in FIG. 20. In this way, with the ring elements 110 and 120 opened, the gripping unit may be brought coaxial with the MP, and may possibly bring the MP in contact with the second ring element 120 or even with the first ring element 110.

Figure 21:
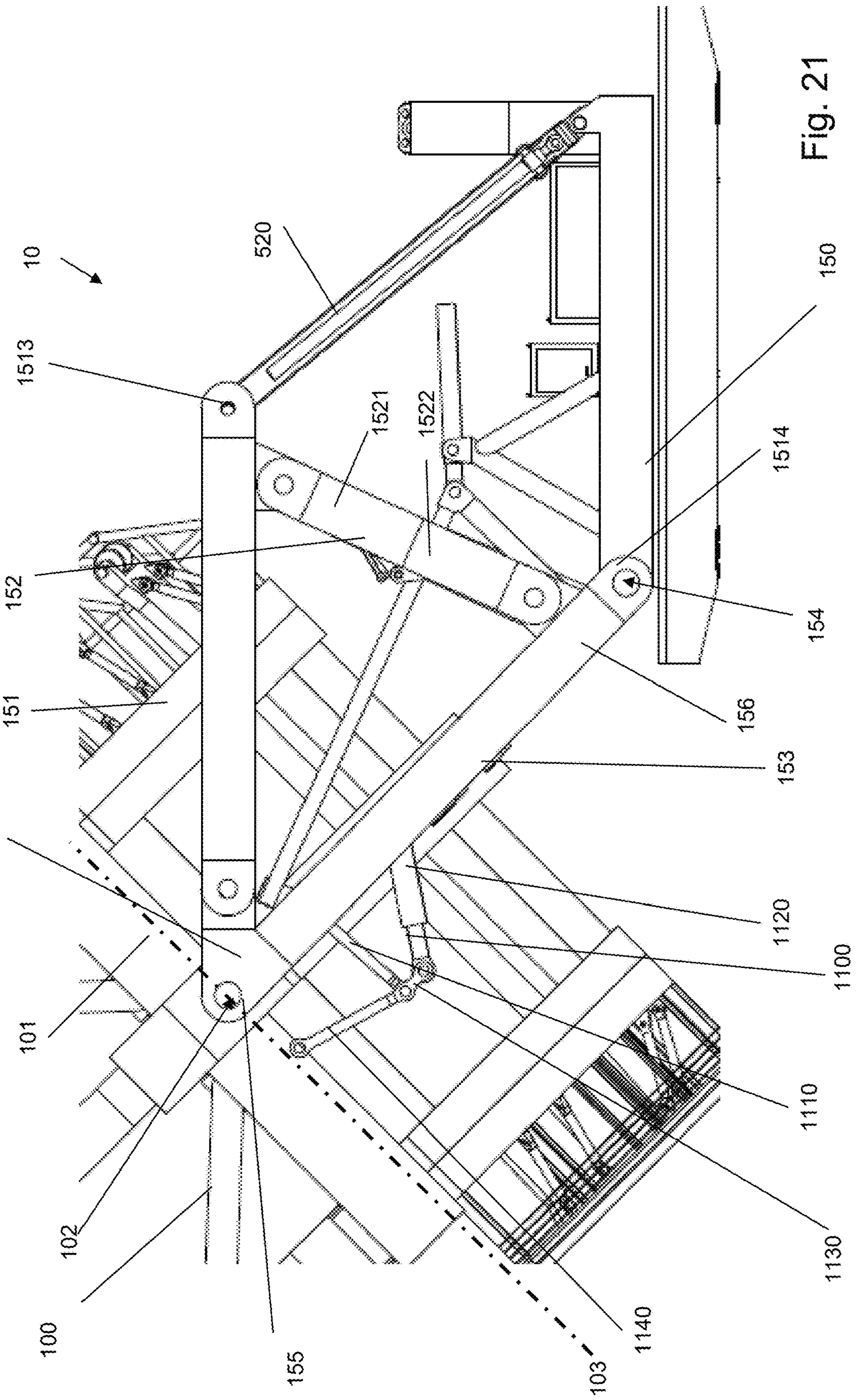
Figure 22:
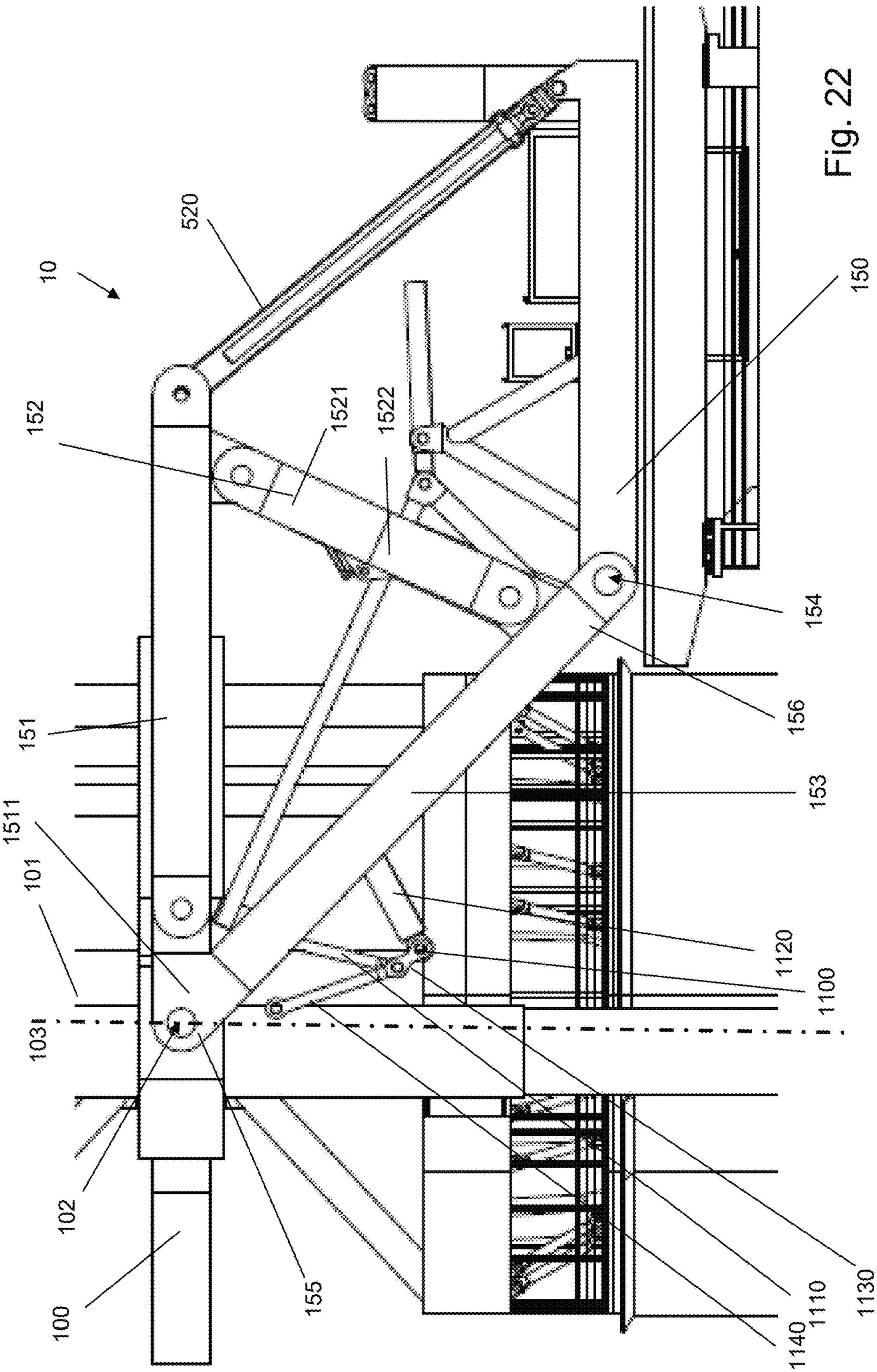

As is further shown in FIGS. 20 to 22, the gripping unit 101 may be tilted round a tilting axis 102. In this embodiment, this tilting is controlled by means of a movable four-bar system comprising a first 1110, a second 1120, a third 1130 and a fourth bar 1140. Details are best visible in FIG. 23. By the particular interconnection of the bars and the way these are coupled the moveable frame 151, the tilting of the gripper unit is controlled.

The MP is brought from a position in which the gripping unit 151 gripping the MP in horizontal orientation in FIG. 20, via an intermediate position in FIG. 21 to a vertical orientation in FIG. 22.

The first and second bar, the latter being an extendible bar, by their first ends 1111 respectively 1121, are each individually freely rotatably connected to the moveable beam 153 at the same side in view of the tilting axis 102. This movable beam 153 is the beam in the movable frame 151 connecting the lower obtuse angled corner with the upper acute angled corner where the gripper unit is coupled to the movable frame 151. The first bar 1110 is connected to the moveable beam 153 at a first position 1101 closer to the tilting axis 102 as compares to the second position 1102 at which the second bar 1120 is connected to the moveable beam 153. The second end 1112 of the first bar 1110 is freely rotatably connected to a first point 1133 on the third bar 1130. The second end 1122 of the second bar 1120 is freely rotatably connected to a second point 1134 at the third bar 1130.

Figure 23:
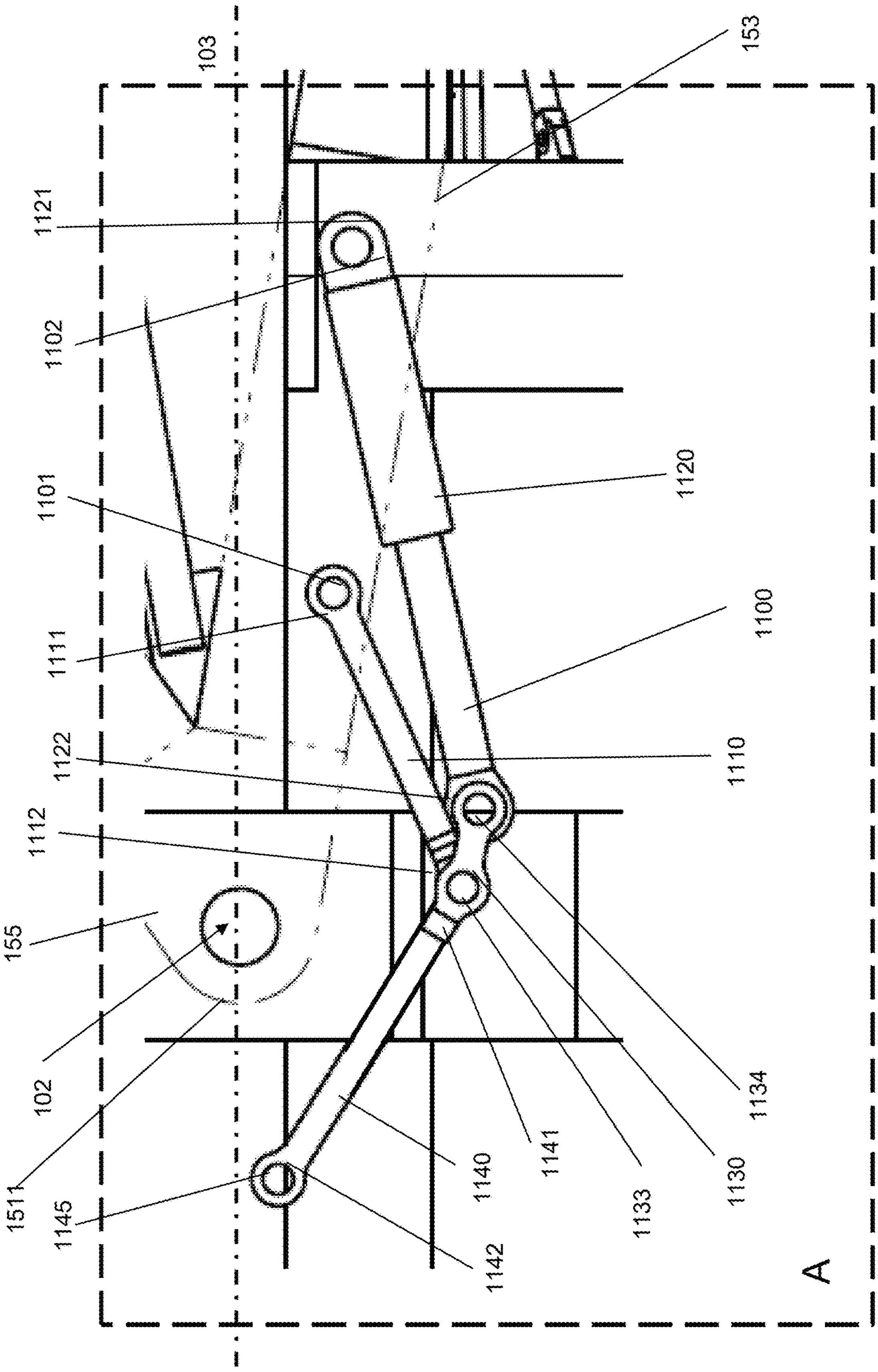
FIG. 23 shows a schematically view of a multiple bar system to tilt the gripping unit being part of the handling system of the FIGS. 1 to 22.

The first and second bar do not cross. As shown in FIG. 23, the first and second point 1133 and 1134 on the third bar and the two connection points 1101 and 1102 of the first and second bar form the angles of a convex quadrilateral.

The fourth bar 1140 is at its first end 1141 freely rotatably connected to the first point 1133 on the third bar 1130, the second end 1142 of the fourth bar is connected to the gripper unit 101. The connection point 1145 of the fourth bar 1140 to the gripper unit and the first and second position on the moveable beam are at the same side of the plane defined by the tilting axis and the longitudinal axis 103 of the gripping unit 101, which is parallel to the plane 302, while the connection point of the fourth bar to the gripper unit on the one hand, and the first and second position on the moveable beam at the other hand, are at a different side of the plane defined by the tilting axis and being perpendicular to the longitudinal axis 103 of the gripping unit.

With such setup, while keeping the frames 151 and 1611 unmoved, by extending or retracting the extendible bar 1120, the gripping unit 101 may easily be rotated and tilted between its first position in which a plane including the ring element is substantially vertical and its second position in which said plane is substantially horizontal. When the griping unit is poisoned most outwards the vessel deck in its lower position, this tilting operation may bring the MP from a horizontal to a vertical position, hence may upright the MP, without the need to make changes to the supporting structure 150.

The handling system 10 further comprises an outrigger 1200. The outrigger is adapted to be coupled to an outer end of the elongate object. This outrigger 1200 is adapted to fold down to create clearance for the elongate object, like a monopile, to shift from storage position to the upending line. The outrigger 1200 is adapted to be moved in a direction 231 perpendicular to the longitudinal direction of the outrigger, preferably using hydraulic means. The outrigger is coupled to e.g. the deck or any other part of a vessel, by means a polygonal, parallelogram-shaped frame having hinging angles allowing to adjust the height of the polygonal.

Turing in detail to the FIGS. 1 to 6, consecutive steps of the action to load an MP in a gripper unit 101 of the handling system 10 on the vessel 1000 are shown. FIG. 1 shows the handling system in resting conditions, e.g. during sailing to the position at sea where the MP is to be installed. Several MP's 900 (only one is shown for clarity purposes) rest on deck 1001 on a pair of supports 222, one of the pairs provided at the side of the ship on starboard side, the other at the side of the ship on port side. The gripper unit 101 is retracted on deck, as well as the outrigger 1200.

Figure 2:
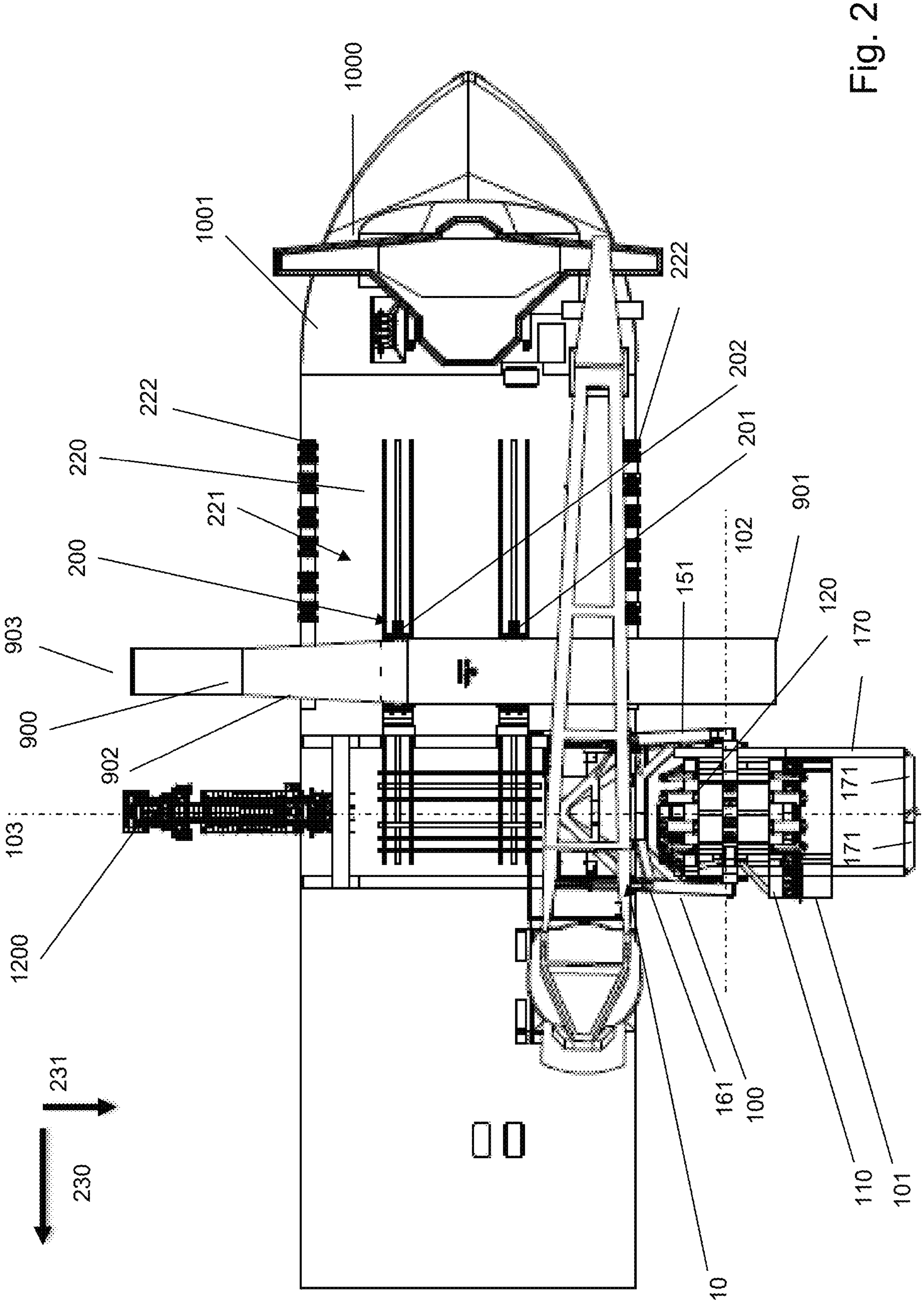

At the targeted position on sea, the vessel is brought in condition to load a first MP in the gripper unit 101. The gripper unit 101 is brought in a condition where it hangs outside the deck 1001, in its lower position, with opened ring elements 110 and 120. At first the moveable frame 151 is as shown in FIGS. 18, the griping unit being poisoned most outwards the vessel deck in its lower position, with the movable frame 151 in extended position as shown FIG. 19. The movable frame 151 brought in its retracted position as shown FIG. 18. The outrigger 1200 is also brought in its position most remote from the vessel deck 1001 outwards the vessel. This position is shown in FIG. 2. The gripper unit 101 is now in a position fit to receive an MP. Meanwhile also the outrigger is fold down such that the elements of the outrigger does not hinder the MP to be moved to obtain alignment with the gripper unit. The outrigger may have elements which themselves can fold down individually, e.g. downwards towards the plane of the deck, or the complete outrigger may be folded down, e.g. downwards towards the hull of the vessel.

Figure 3:
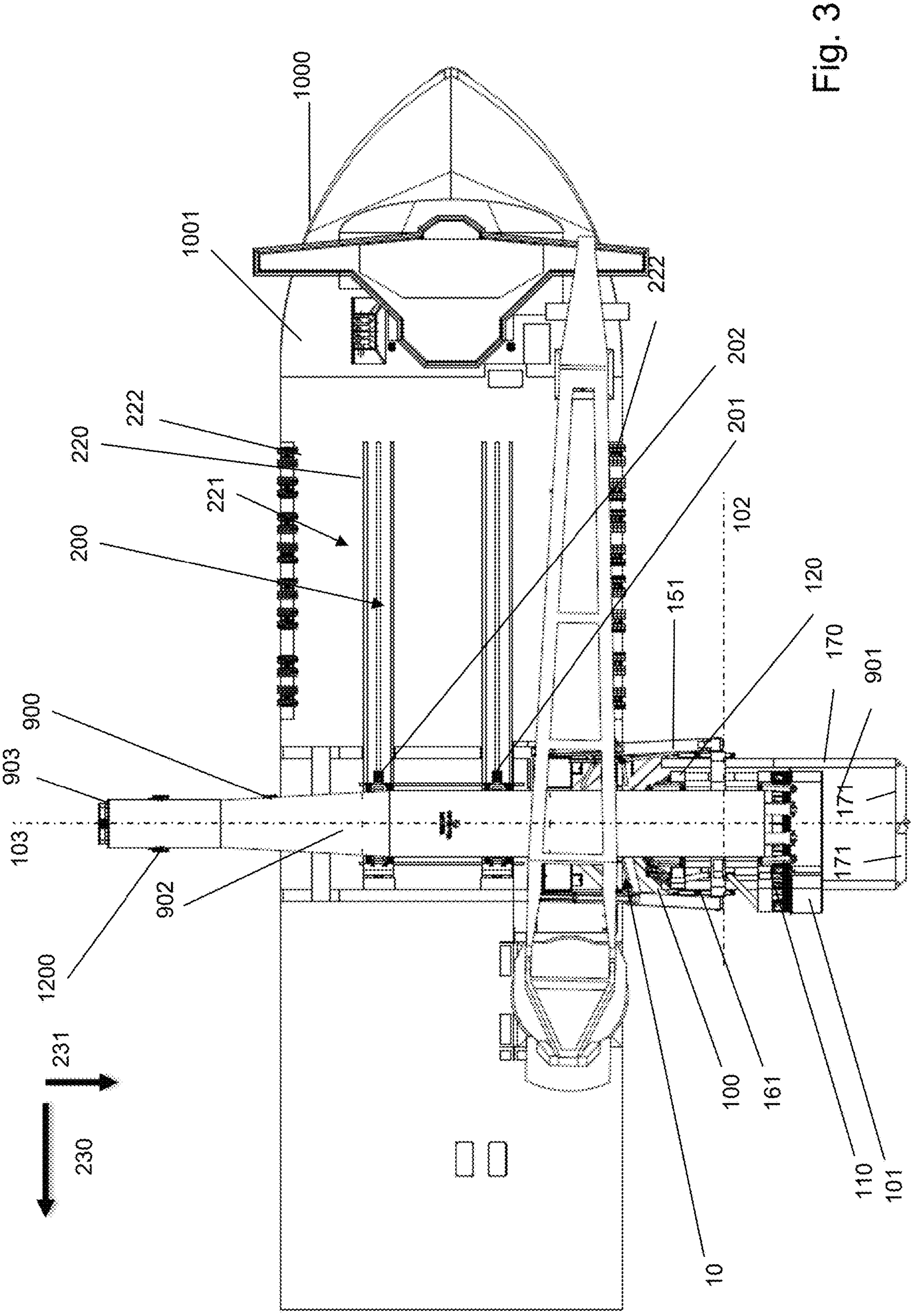

As is shown in FIG. 3, the inner and outer cart 201 and 202 of the skidding system 200 lift the MP from its pair of supports 222, and move the lifted MP backwards in direction 230, over the vessel deck 1001. As the movable frame 151 is in retracted position, as shown in FIG. 19, the inner and outer carts 201 and 202 may move the MP such that the axis of the MP aligned above the axis of the gripper unit 101.

Figure 4:
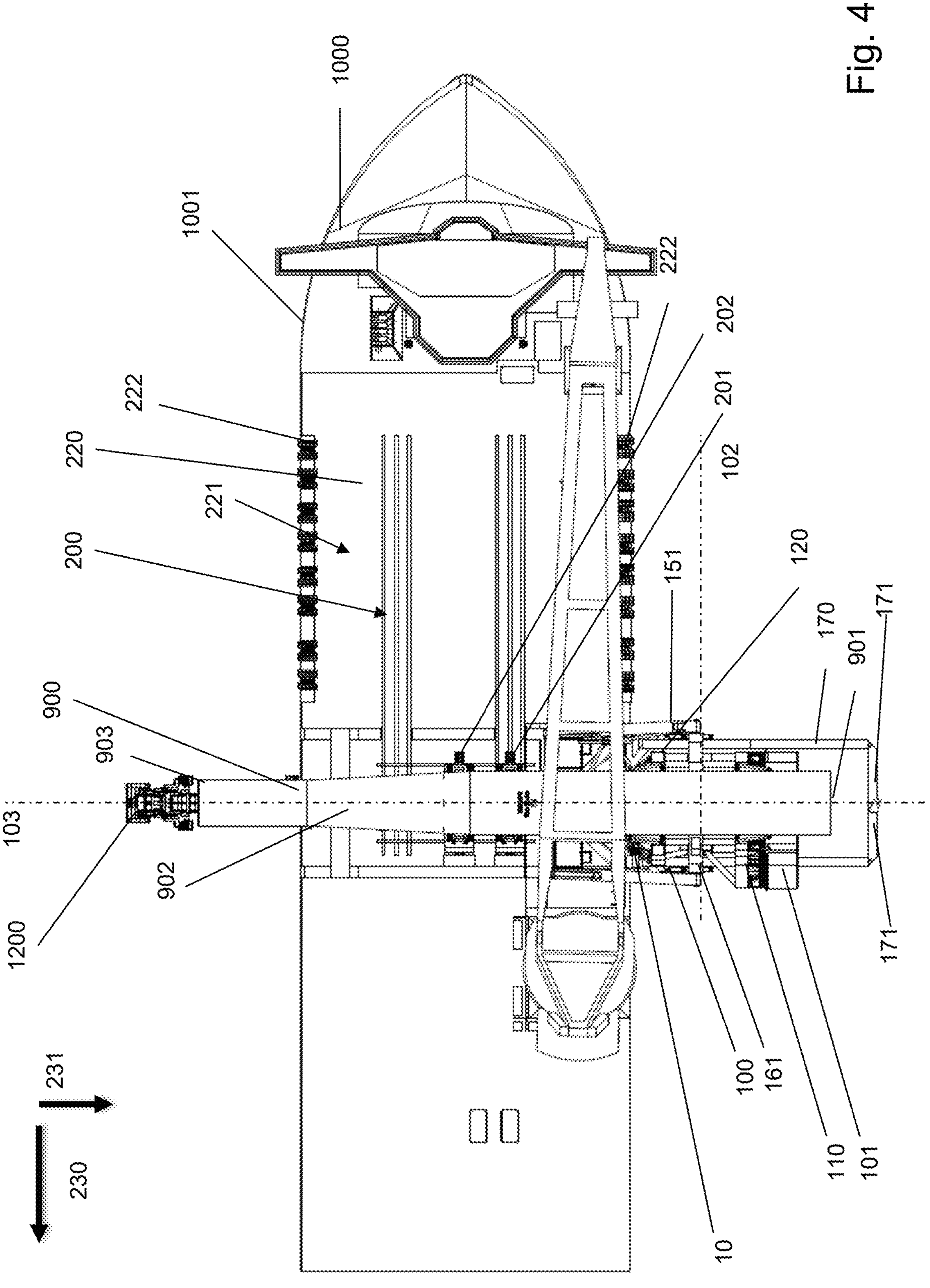
Figure 5:
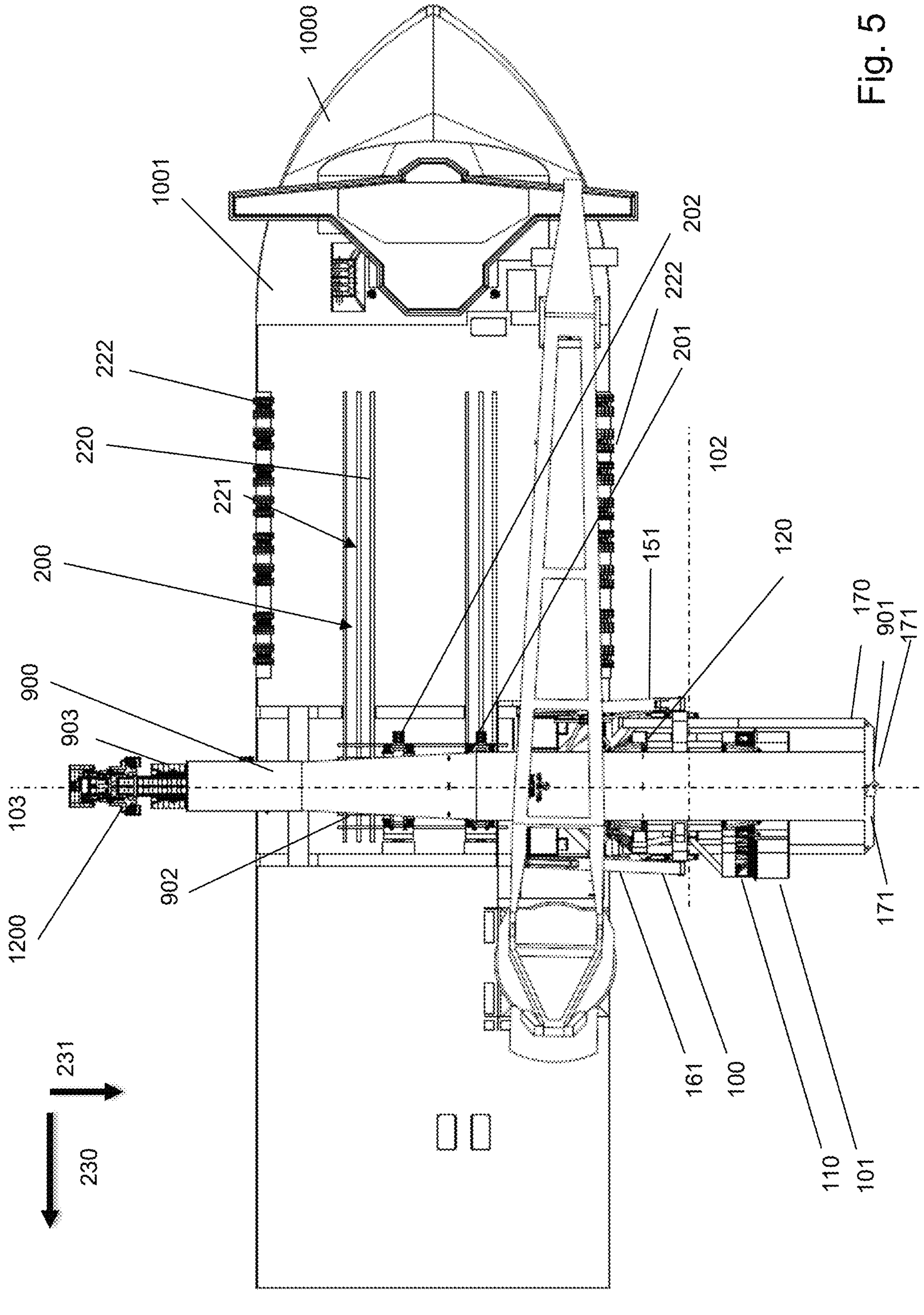

Turning to FIG. 4, the outer cart 202 may continue support g the MP 900, while the inner cart 201 may or may not be retracted in height to disconnect from the outer surface of the MP 900. The gripper unit may be brought in the position as shown in FIG. 20, after having its movable frame 151 being brought in the extended position of FIG. 19. The outer cart 202 moves in a direction 231 thereby pushing the MP further into the gripper unit 101. At this moment the MP 900 may not have reached its final position in the gripper unit 101, where its first outer end 901 has not been brought in contact with the fingers 71 of the extendible arms 170. The outer charts 202 height is lowered, while the MP is supported by the inner cart at one side and the ring elements of the gripper unit at the other hand. The outer chart is moved back to some extent in a direction 21 in the sense towards the outrigger, is again raised to contact the outer surface of the MP and repeat the pushing of the MP in a direction 231 in the sense towards the gripper unit. This sequence of movements of the outer cart 202 may be repeated until the MP's outer end 901 contacts the fingers 71 of the extendible arms 170. The situation as shown in FIG. 5 is now reached.

Figure 6:
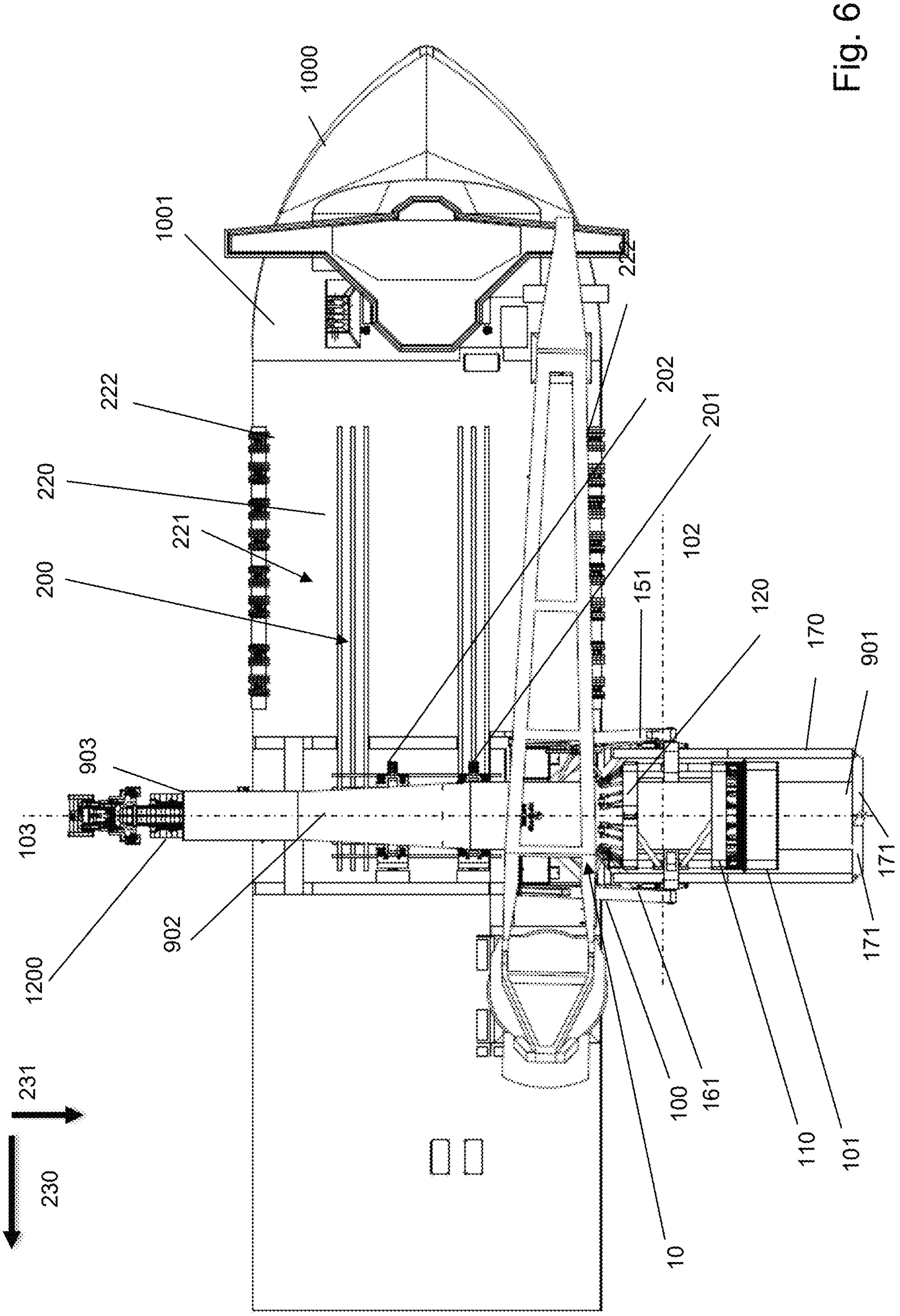

The MP may now be prepared for tilting, by contacting the second outer end 903 to the outrigger, as shown in FIG. 6. Meanwhile the inner cart 201 (or alternatively the outer chart 202) may keep supporting the MP. Optionally, as shown in FIG. 6, an additional supporting means 180 may be provided to take over the support of the MP from the inner and outer carts. When the ring elements are closed, the MP is fit for being tilted, as is shown in FIGS. 20 to 22.

The last steps for pushing the MP 900 in the gripper unit by the outer cart 202, may be replaced by first coupling the outer end 903 to the outrigger, and thereafter pushing the MP 900 into the gripper by a movement of the outrigger itself.

Figure 7:
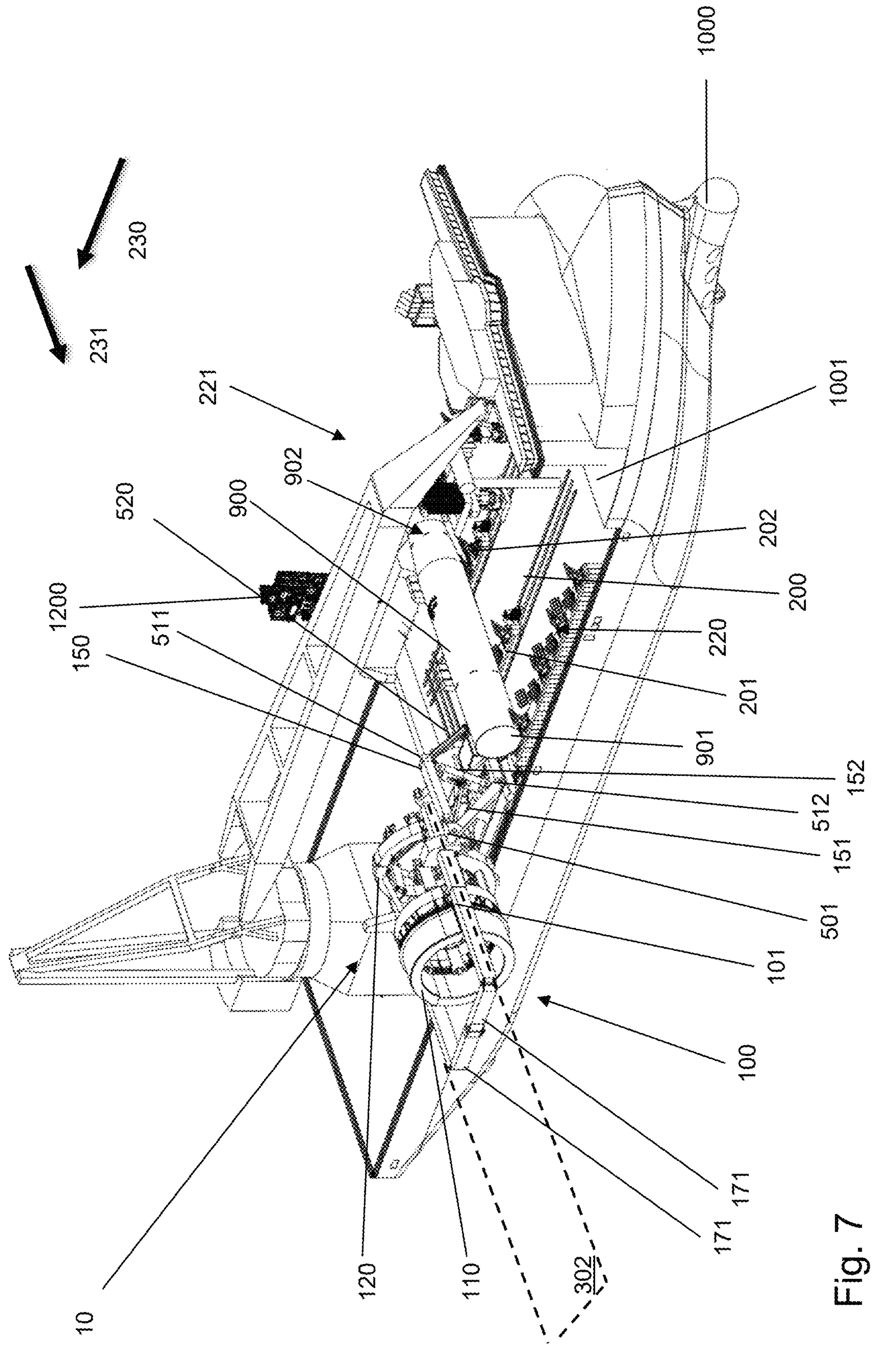
FIGS. 7 to 17 show a top views or perspective views of this vessel comprising a handling system according to the invention, disclosing several steps of this handling system in its action to upright a smaller monopile.

In a similar way, the loading of the gripper unit 101 with a smaller, less long MP, is showing in FIGS. 7 to 17. In FIG. 7, the gripper unit 101 is moved from its resting position to the lower position hanging overboard the vessel deck 1001, the ring elements 110 and 120 being still in closed position. The short MP 900 is still stored and supported on its pair of supports 222. The outrigger is moved aside to a position extending overboard the vessel deck.

Figure 8:
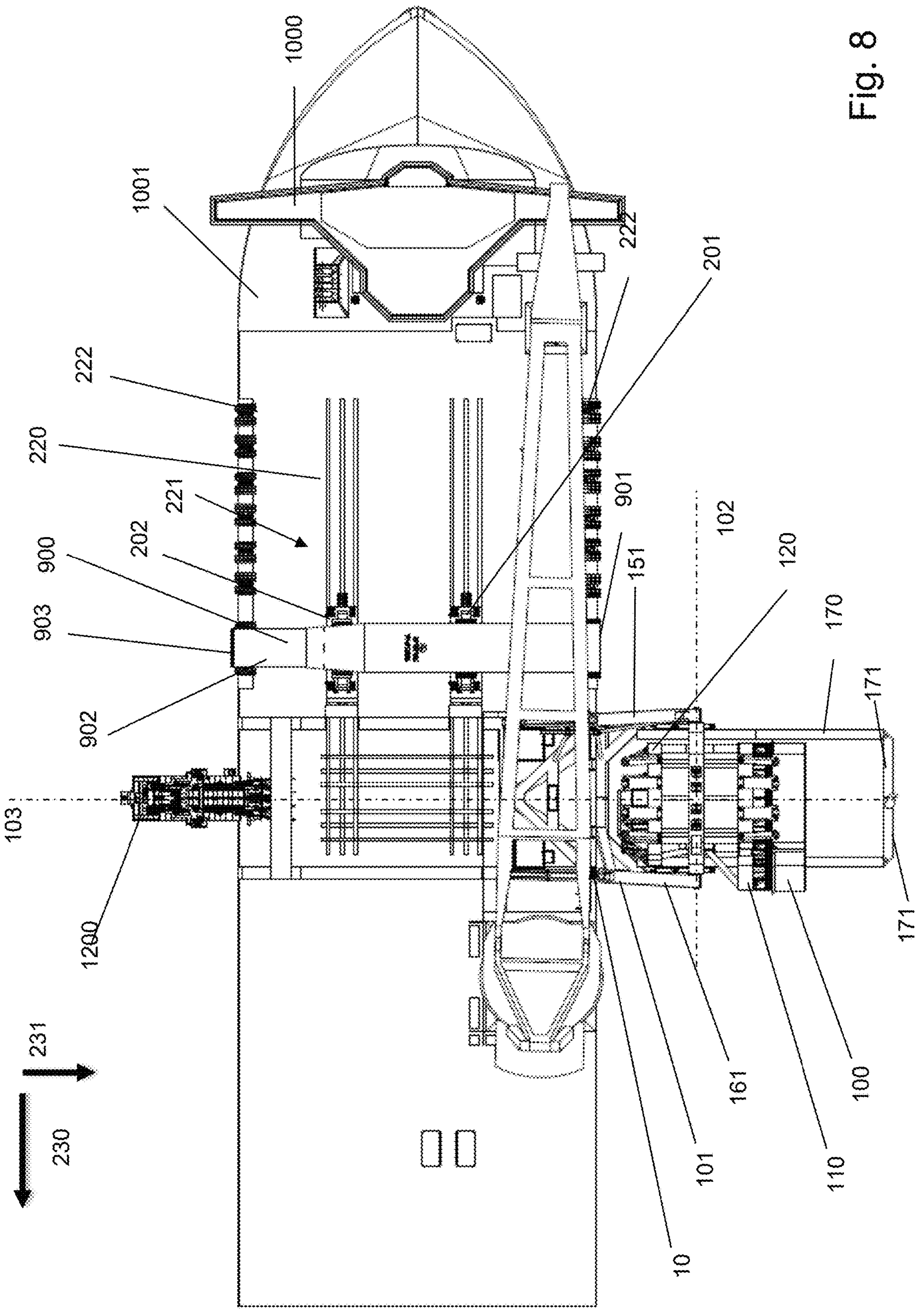
Figure 9:
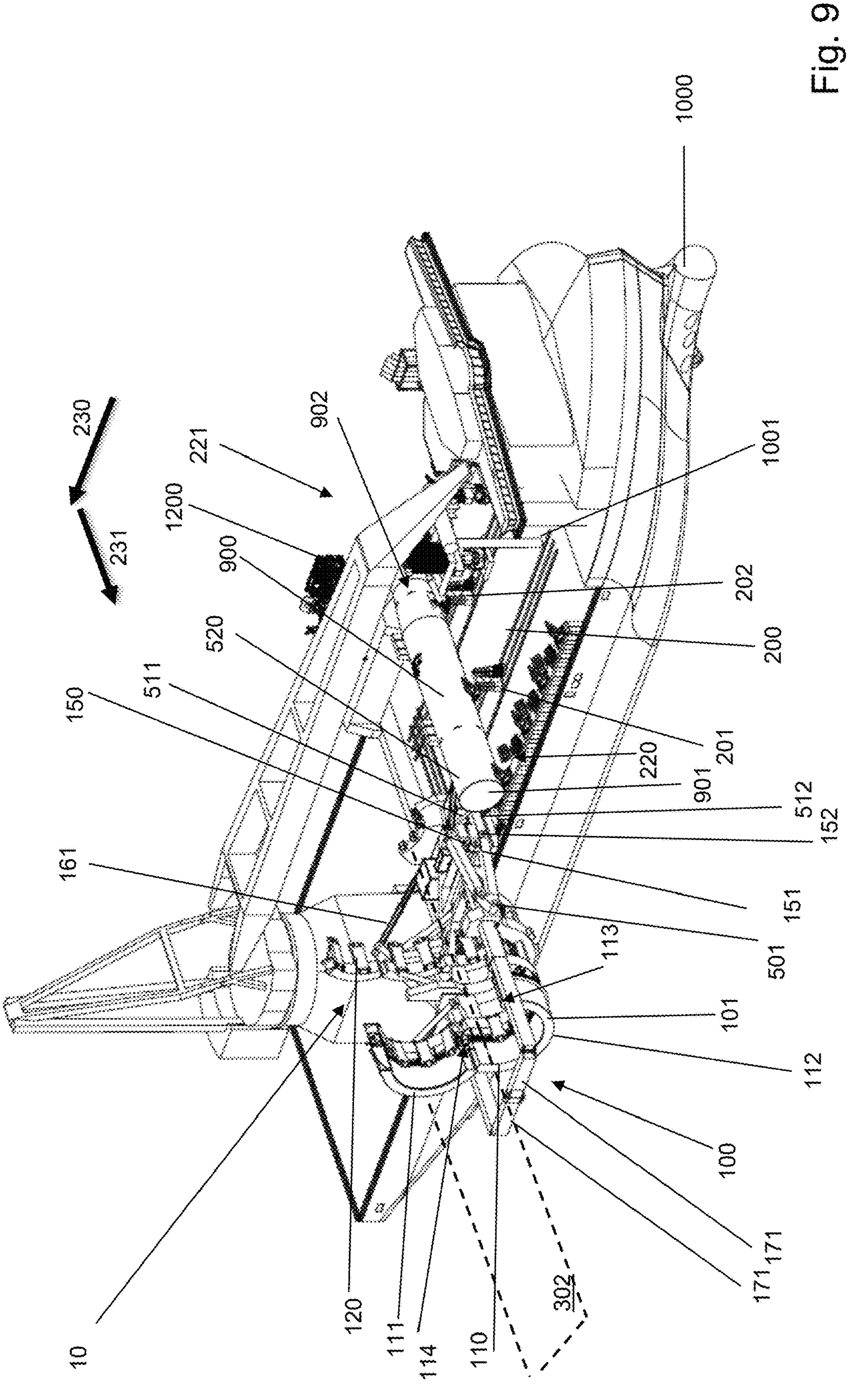
Figure 10:
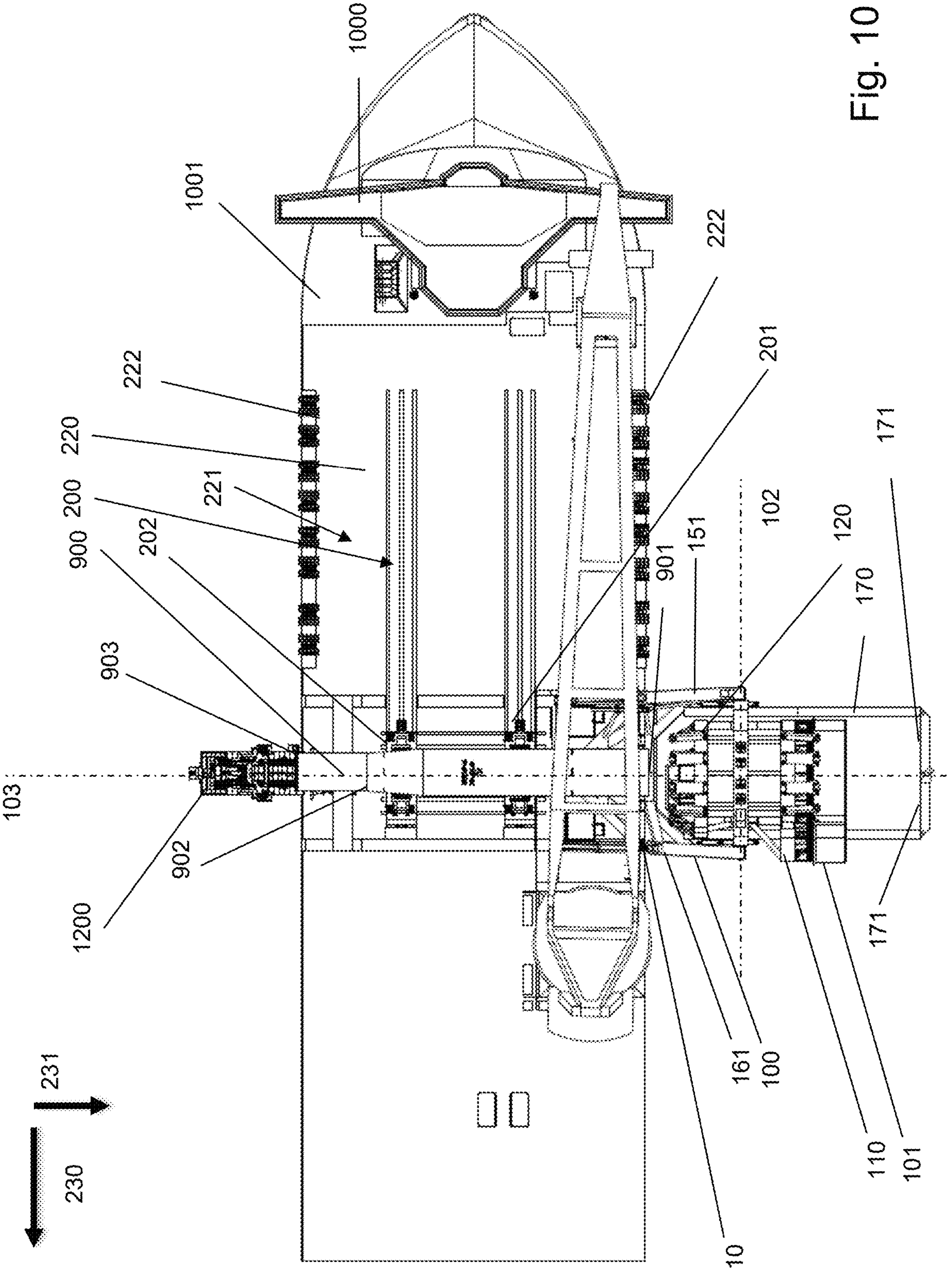

In FIGS. 8 and 9, being the same position shown from top and perspective view, the ring elements 110 and 120 of the gripping unit 101 are opened. Similar as in FIG. 2, the gripping unit 101 is brought at its lower position aside the vessel, and the moving frame 151 is retracted.

Figure 11:
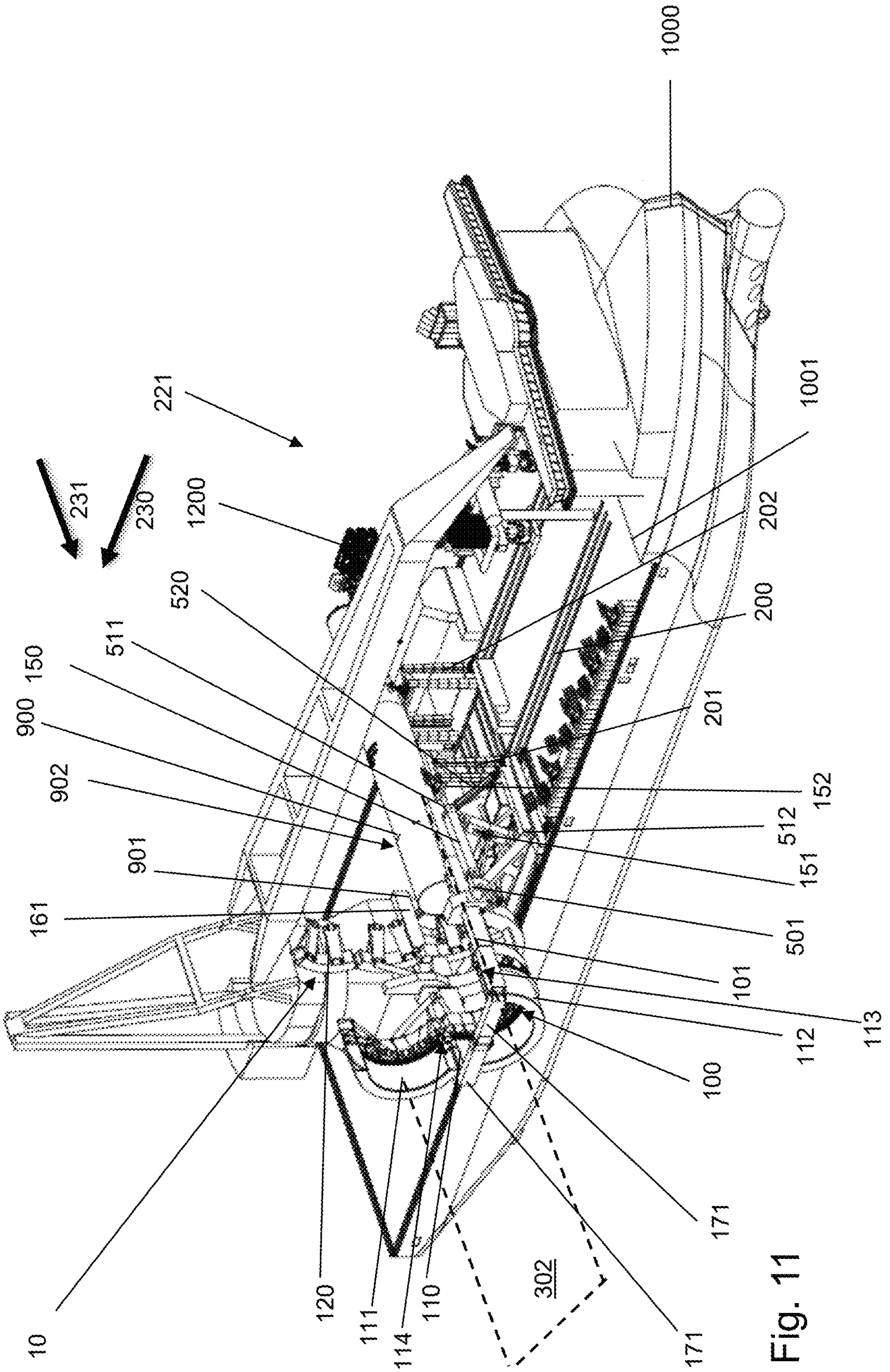

In the same sequence as described for the longer MP's in FIG. 2 and FIG. 3, the inner and pouter carts 201 and 2021 lift an MP 900 from their pair of supports, and bring it towards the gripping unit 101 in the direction 230, thereby hoisting the MP over the retracted movable fame 151. It is to be noted that the position of the outrigger 1200 is such that no need to fold the outrigger down is necessary. This is visible in FIG. 10. The extendible arms 170 now are retracted to bring the fingers closer to the griming units outer end, in order to accommodate the shorter length of the MP. As such the position in FIG. 11 is obtained. This repositioning of the extendible arms 170 may be executed earlier in the process as well. After passing the MP over the movable frame 151, the movable frame is extended again.

Figure 12:
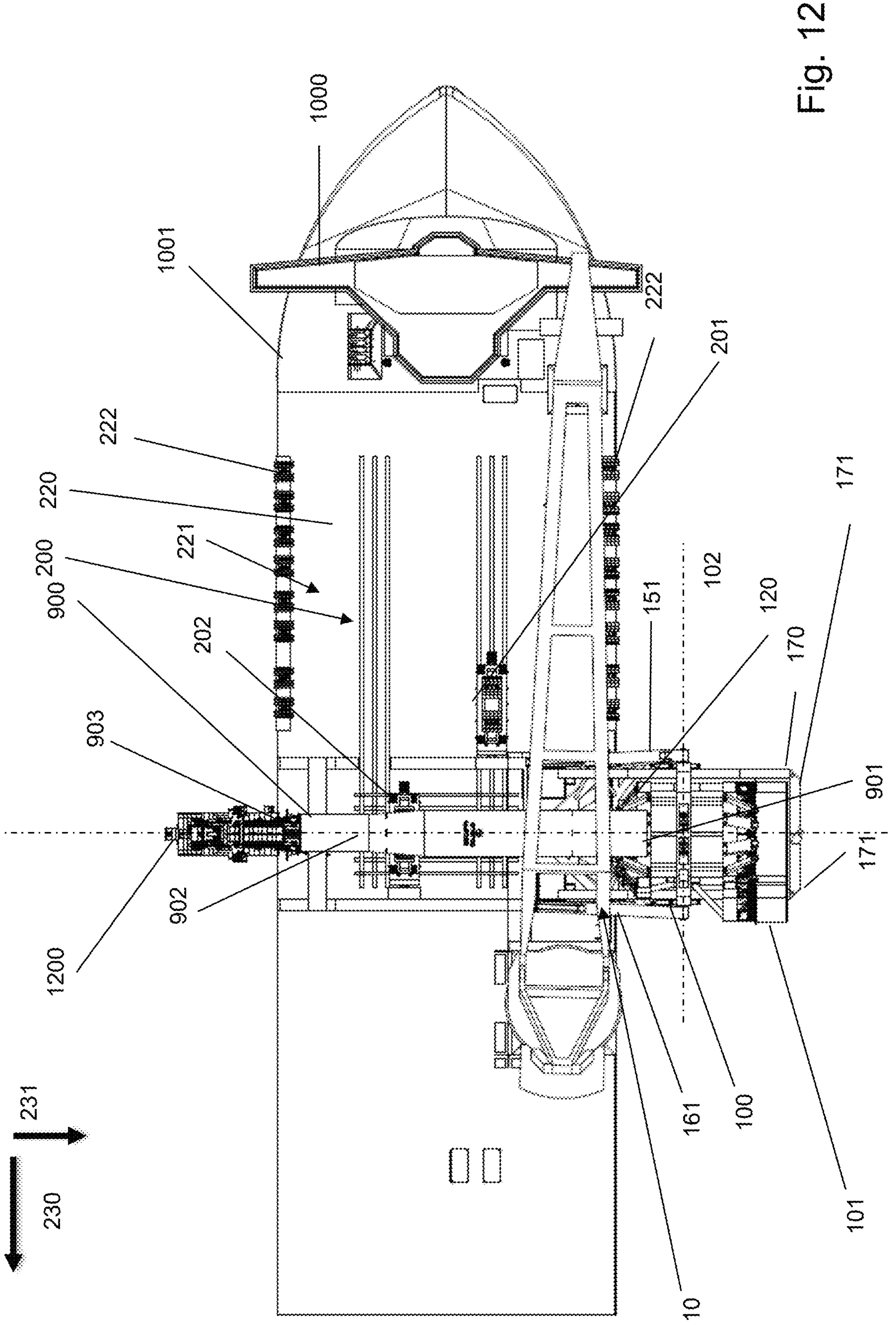
Figure 13:
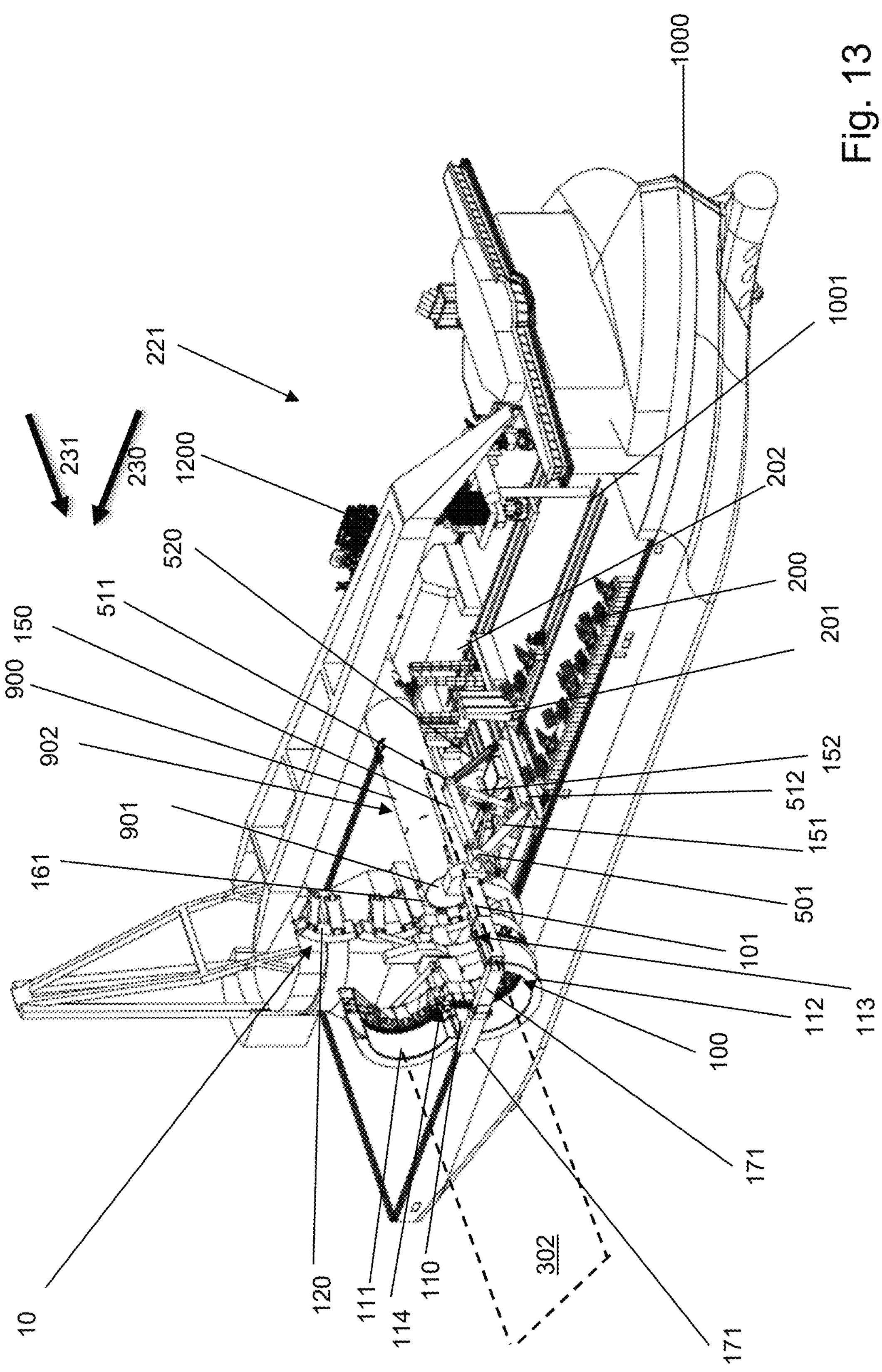
Figure 14:
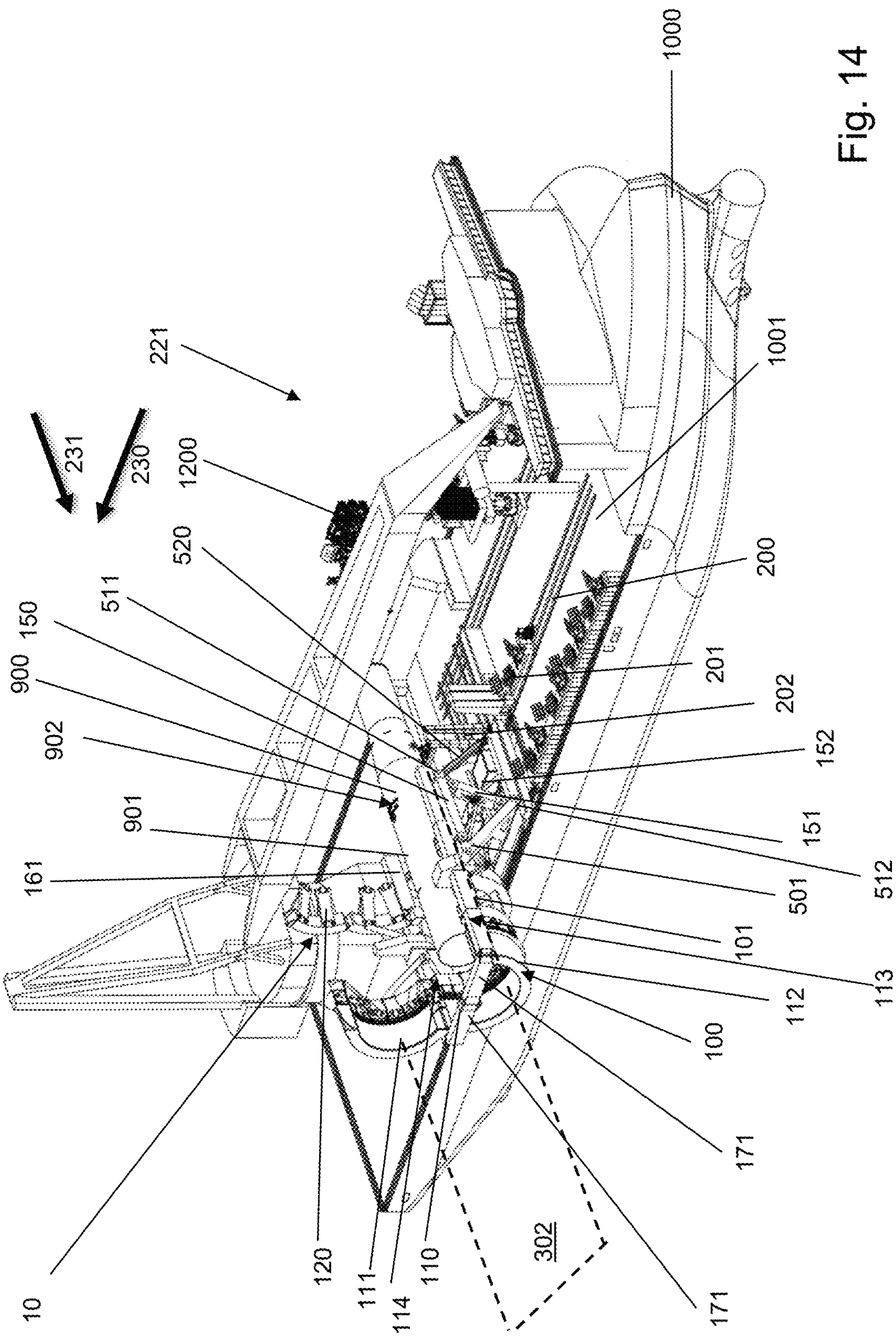
Figure 15:
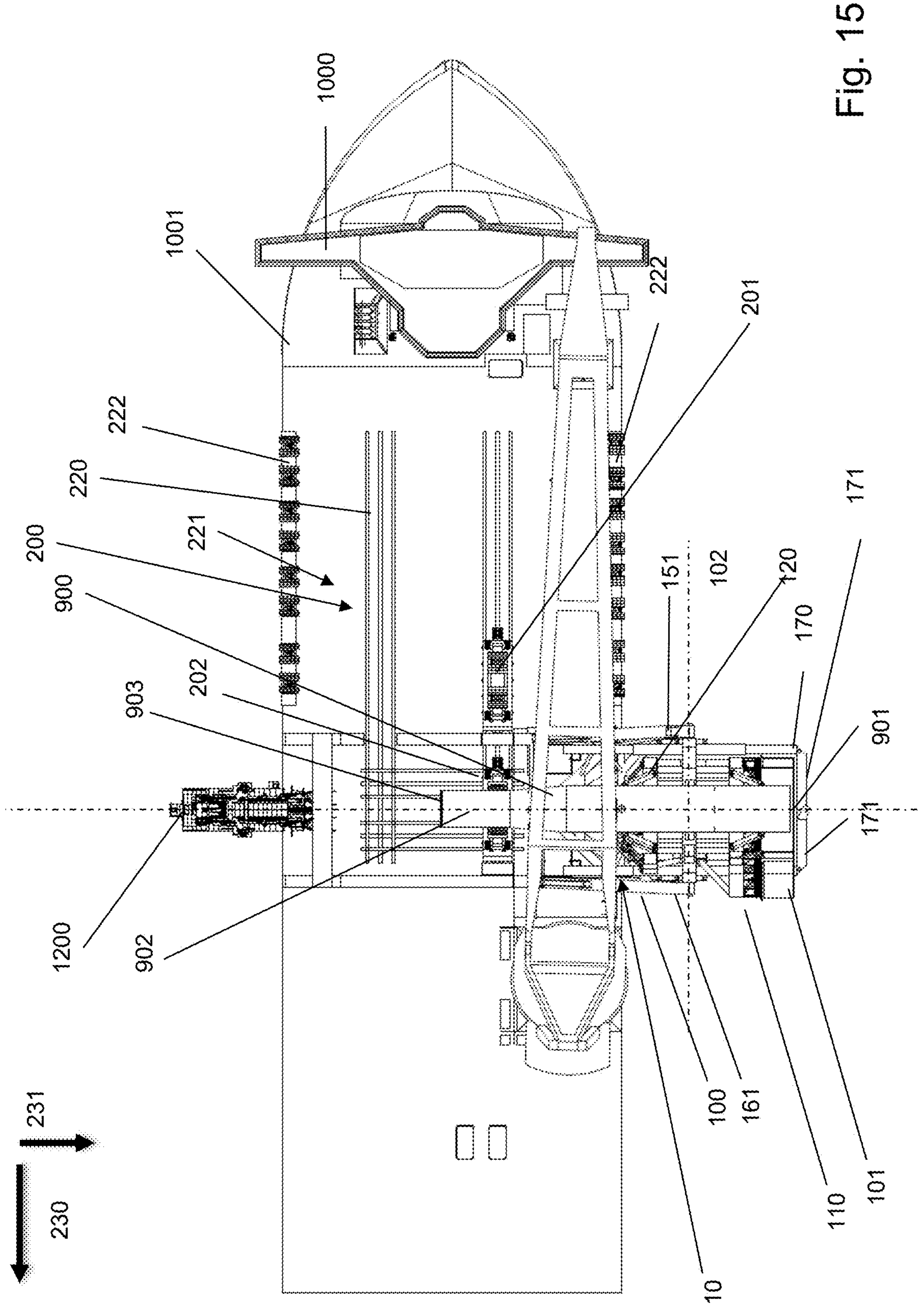
Figure 16:
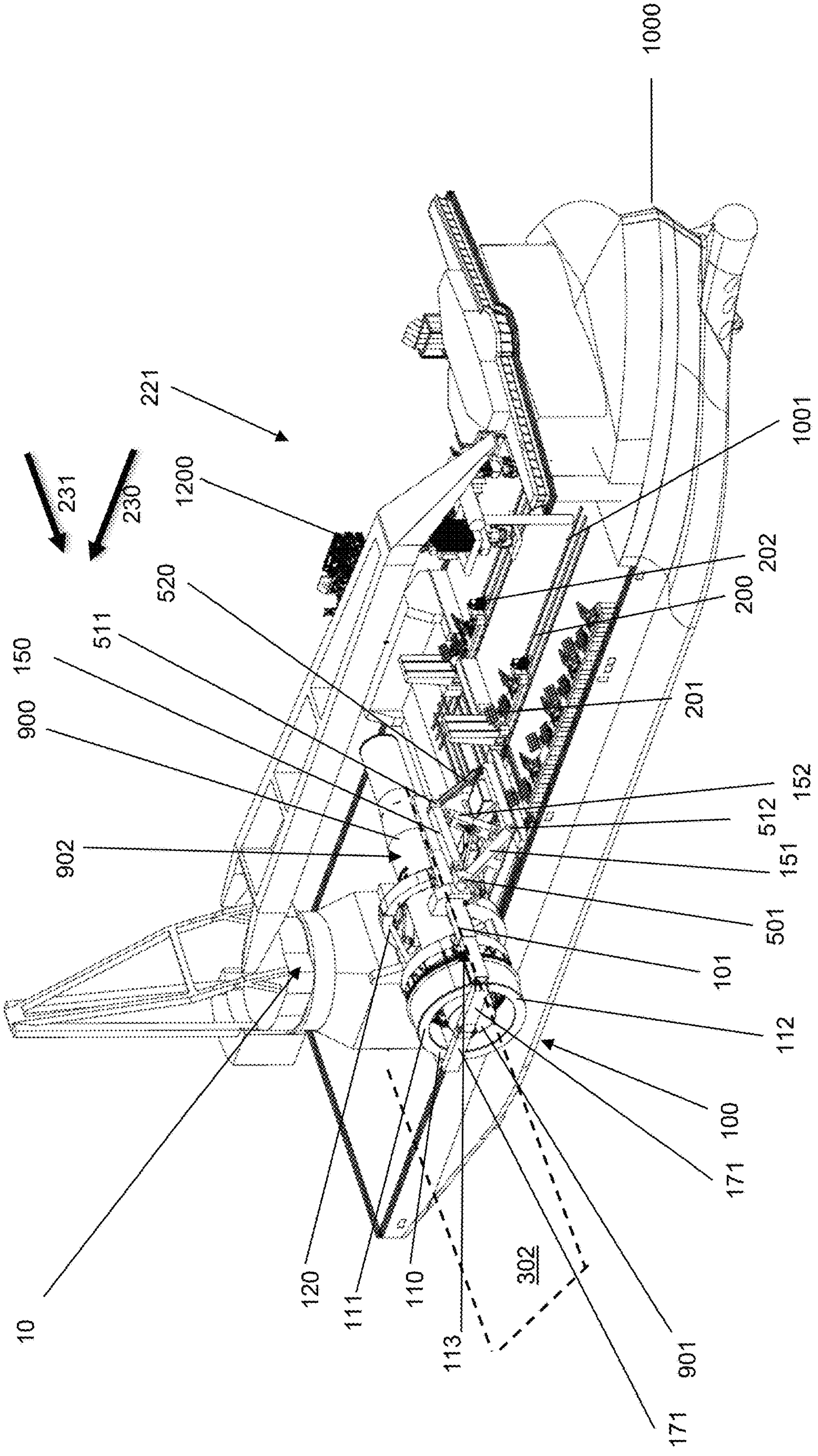

In the next step, the inner cart 201 is moved back to the storage location, while the outer cart 202 moves in a direction towards the gripper unit while supporting the MP, as shown in FIGS. 12, 13 and 14, until the outer end 901 of the MP 900 is on contact with the fingers 171 as in FIG. 15.

In order to avoid uncontrolled tilting to the MP inwards the vessel when being poisoned but not yet gripped by the griping unit, additional supporting means 180 may be provided adjacent the second ring element 120.

Figure 17:
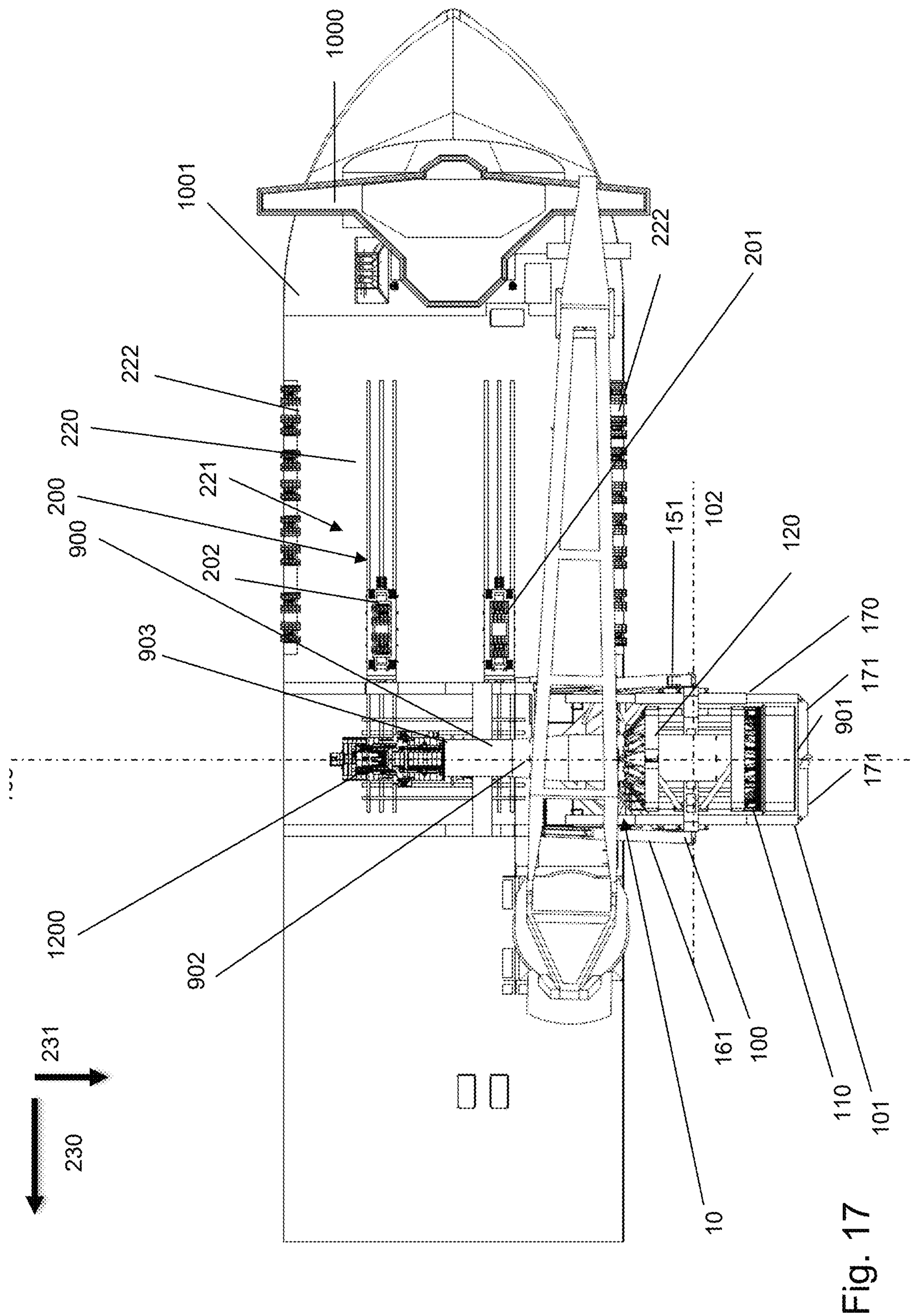

Once the MP is positioned, the ring elements 110 and 120 close, and the outrigger may be brought to the outer end 903 of the MP, as shown in FIG. 17, fur further tilting and uprighting the MP.

Figure 24:
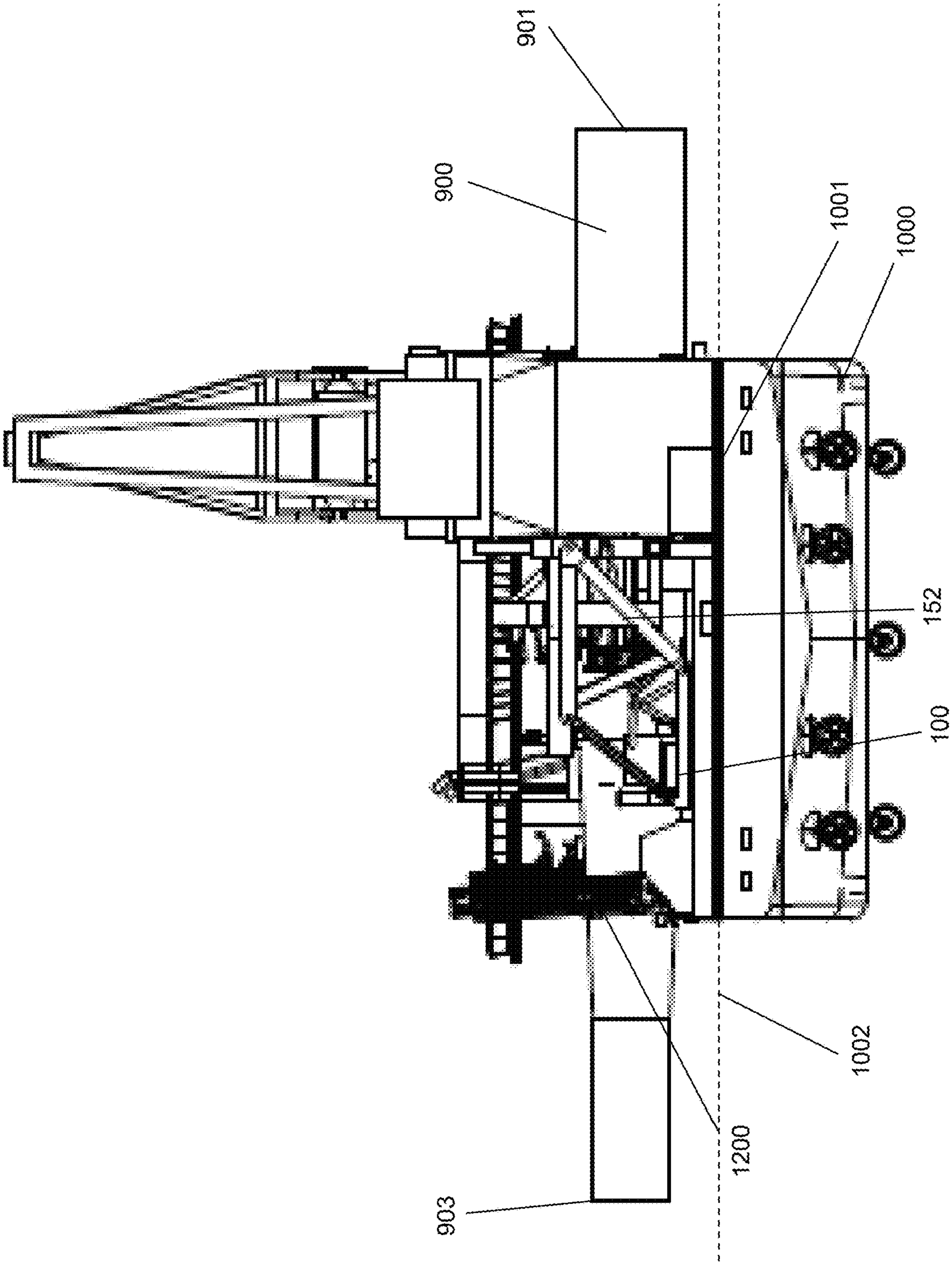
FIGS. 24 to 29 show a view of a the stern of the vessel of FIGS. 1 to 6, during the several steps of this handling system in its action to upright a relatively large monopile as are also shown in FIGS. 1 to 6.

Further to the FIGS. 1 to 6, in FIGS. 24 top 29, similar views are shown of the loading of the MP 900 in the upending system 100 of the vessel 1000. The views are taken from the stern of the vessel 1000. At the second side of the vessel 1000, i.e. the second end of elongate object 903, it is seen that the outrigger 1200 is also moved during the actions as set out for the FIGS. 1 to 6.

FIG. 24 shows the vessel in sailing conditions, the upending system 100 and the outrigger 1200 being positioned and located on board of the vessel at the vessel deck 1001, of which the vessel deck level is identified by reference 1002. The MPs, of which the MP 900 closest to the stern of the vessel 1000 is visible in the FIGS. 24 to 29, is located closer to the fore as compared to the upending system 100 and the outrigger 1200.

Figure 25:
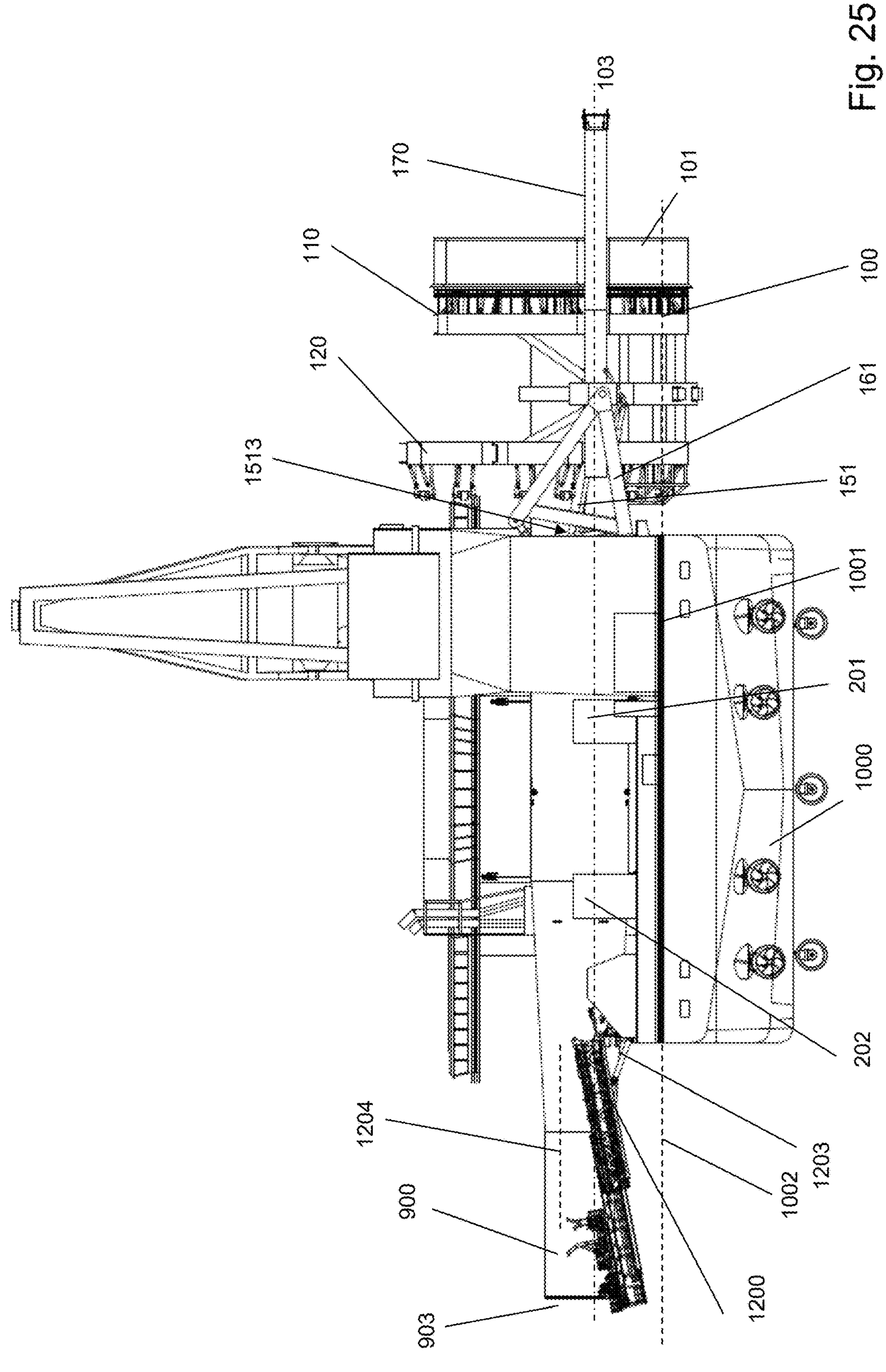

As shown in FIG. 25, the upending system 100 is deployed outside the board of the vessel 1000 at starboard side, where the gripping unit 101, with both ring elements 110 and 120 opened, hang to the two frames 151 and 152, the extendible arm 170 being extended. At port side, the outrigger is deployed as well. While the outrigger 10200 and the gripping unit 101 is at its lower position, it can be seen on FIG. 25 that the highest points of the movable frame 151 in retracted position (i.e. the upper obtuse point 1513), and highest points 1204 of the outrigger, are too high to allow the MP 900 to pass into the gripper unit.

Figure 26:
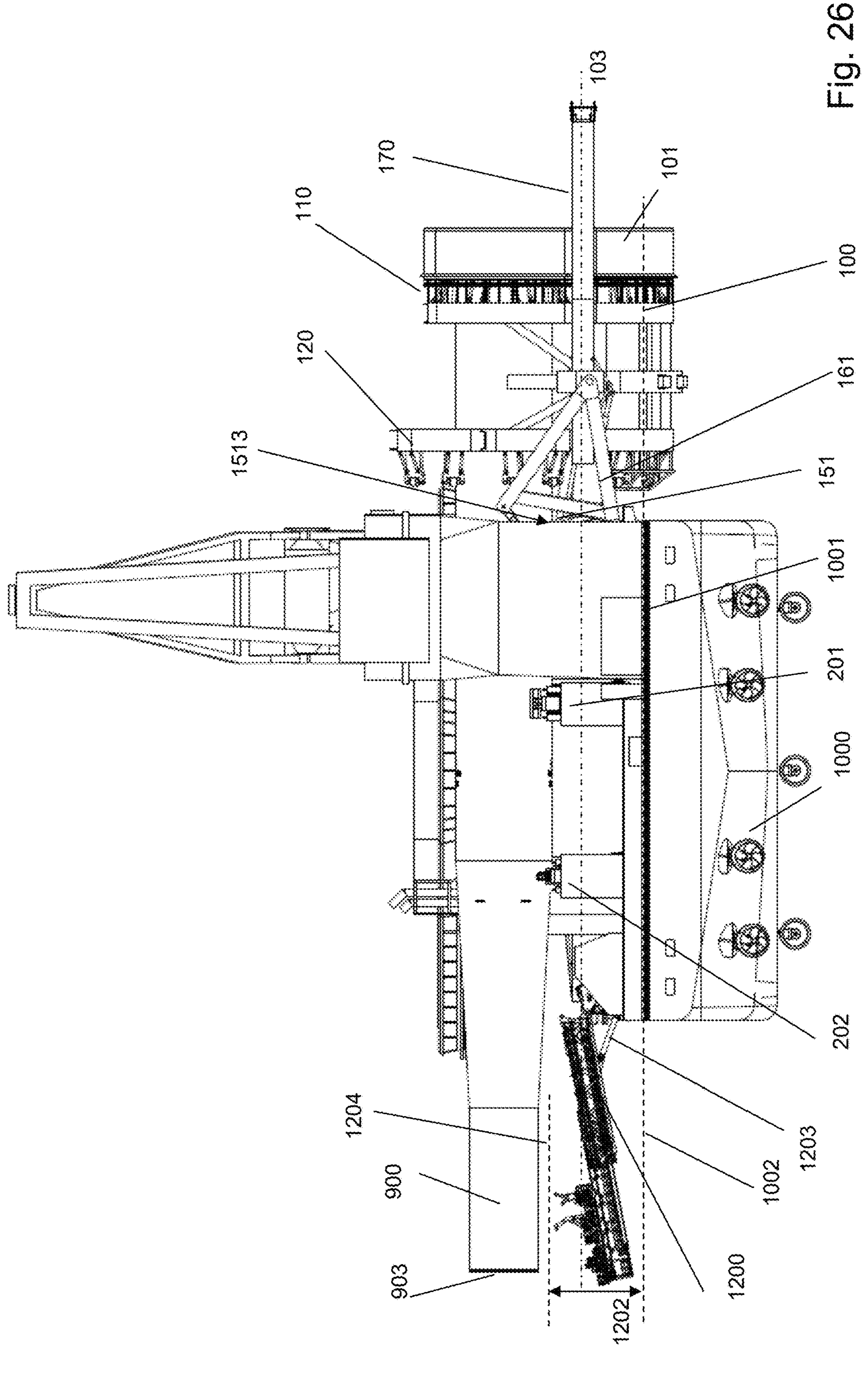
Figure 27:
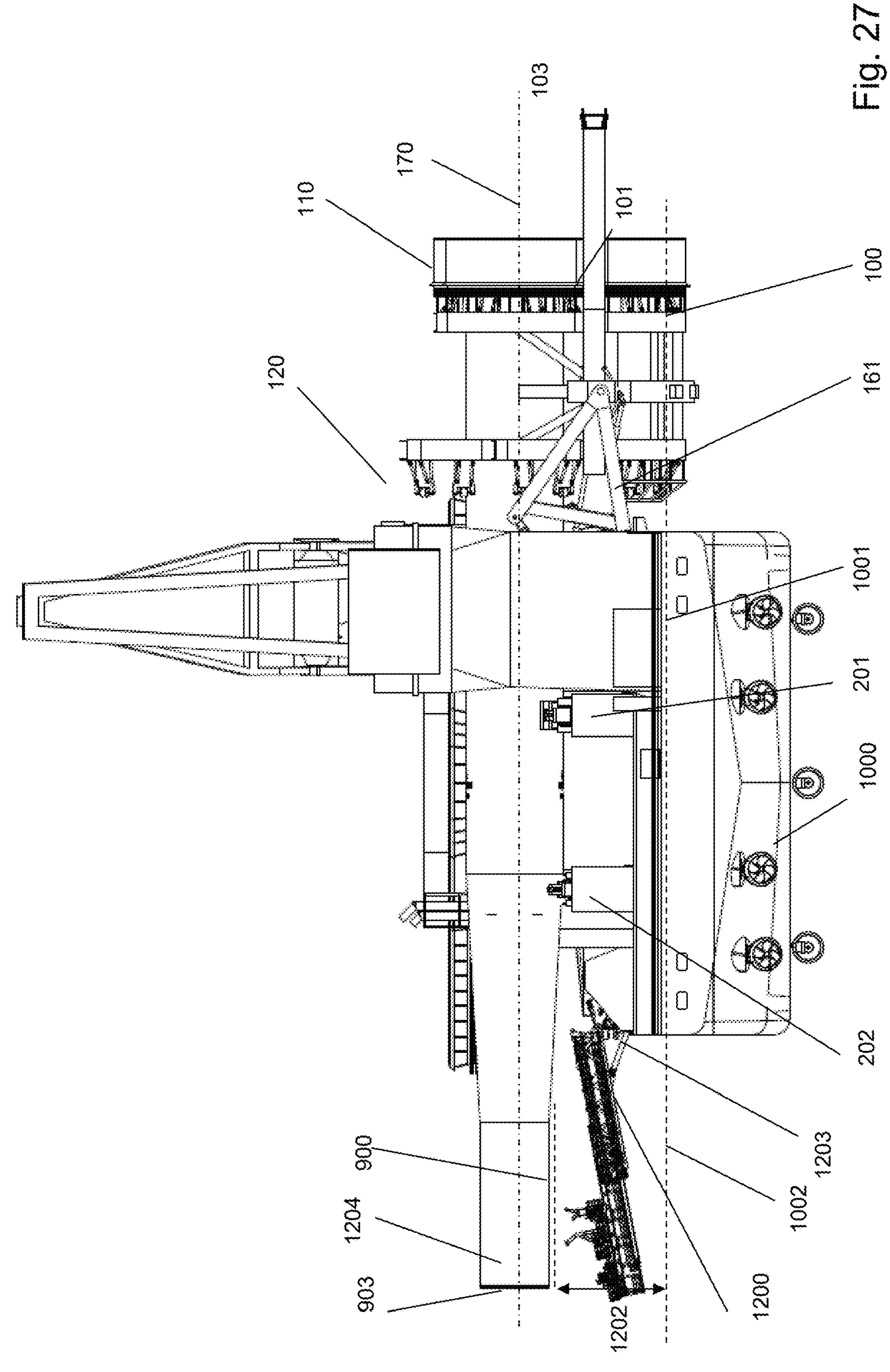

The MP 900 is lifted by the inner and outer carts 201 and 202, and lifted above the higher of the highest points of the movable frame 151 in retracted position (i.e. the upper obtuse point 1513), and highest points 1204 of the outrigger 1200 as shown in FIG. 26. The MP is moved in the direction fore to stern by the carts such that the longitudinal direction of the MP is parallel and above the longitudinal axis 103 of the gripper unit 101. Once in this position, the movable frame 151 is extended again, and the gripper unit is lifted to its upper position, as shown in FIG. 27. The central axis of the MP is colinear to the longitudinal axis 103 of the gripper unit 101.

Figure 28:
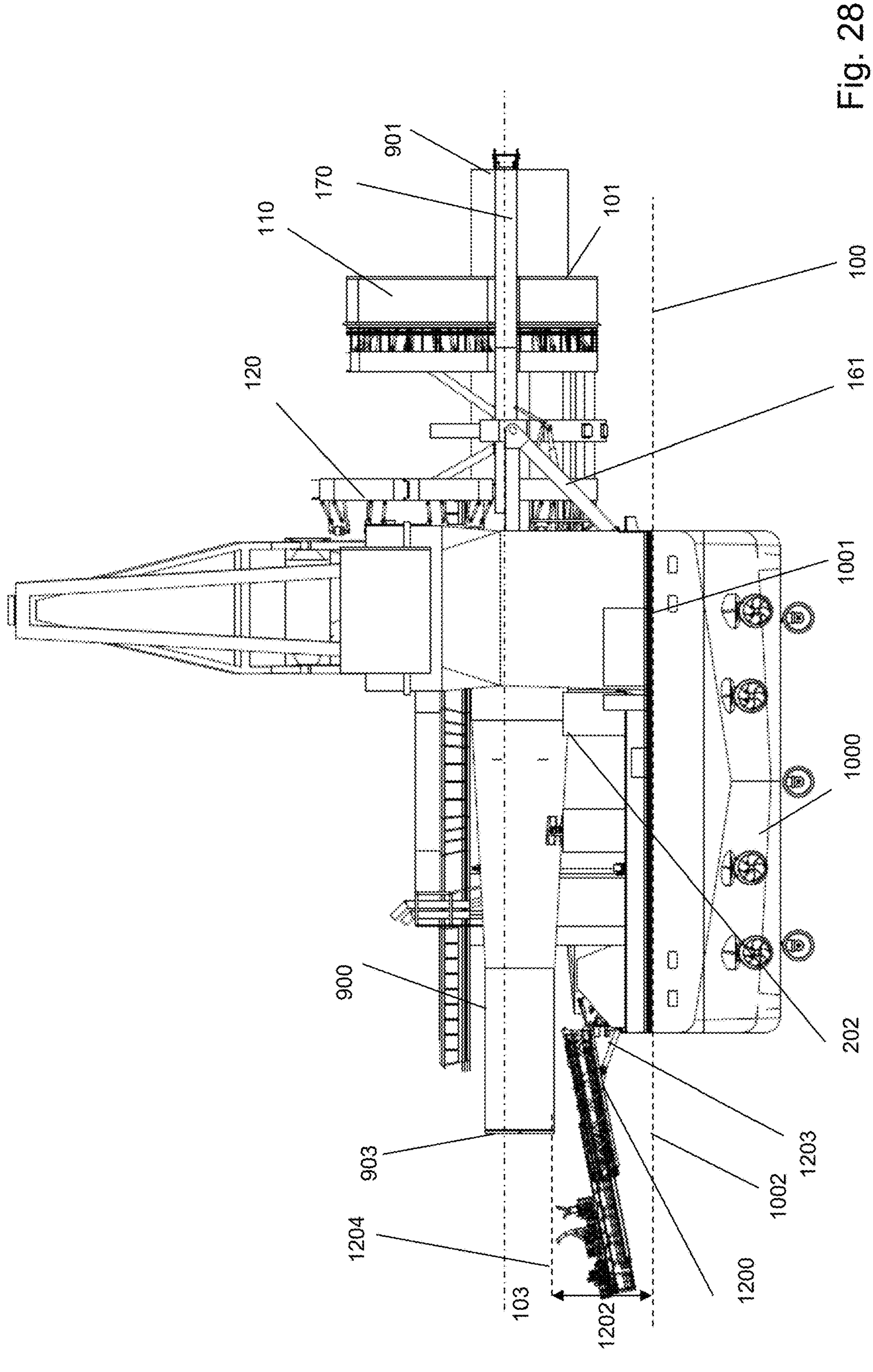
Figure 29:
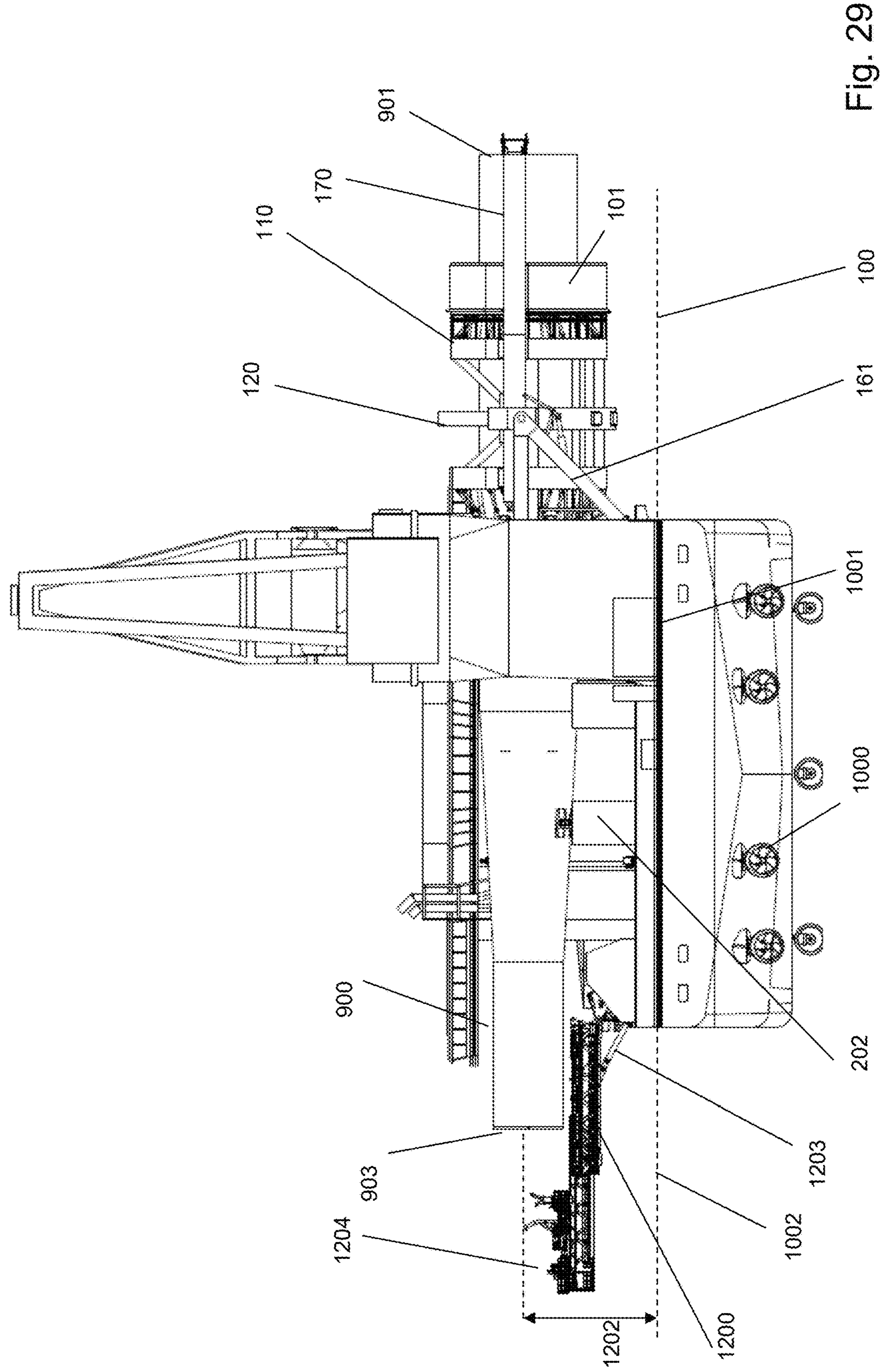

By moving the outer cart in a direction from port side to starboard side while lifting the MP 900, the MP 900 slides further into the gripper unit 101 until the end 901 of the MP contacts the fingers present on the extendible arms 170, obtaining the situation as shown in FIG. 28.

Once this position is obtained, the outrigger is lifted by the lifting or folding system 1203 such that the highest points 1204 of the outrigger 1200 align with the surface of the MP 900. The height 1202 of the outrigger is increased in view of the vessel deck level 1002. This is visible in FIG. 29. By moving the outrigger 1200 towards the outer end 903 of the MP 900, the outrigger may contact the MP 900 and may be coupled to the MP 900. The ring elements 110 and 120 may now close and the outer cart may terminate its support of the MP 900. The MP now is ready for tilting by the upending system.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

REFERENCES

| | |
|---|---|
| 10 | handling system |
| 100 | upending system |
| 101 | gripper unit |
| 102 | tilting axis |
| 103 | longitudinal axis |
| 110 | first ring element |
| 111 | single movable arm |
| 112 | fixed ring part |
| 113 | coupling point |
| 114 | hinging point |
| 120 | second ring element |
| 150 | support structure |
| 151 | movable frame |
| 152 | extendable brace |
| 153 | moveable beam |
| 154 | rotating axis |
| 155 | first end of 153 |
| 156 | second end of 154 |
| 161 | second frame) |
| 170 | extendible arms |
| 171 | movable fingers of 170 |
| 180 | additional supporting means |
| 200 | skidding system |
| 201 | inner cart |
| 202 | outer cart |
| 220 | storage location |
| 221 | storage system |
| 222 | pair of supports |
| 230 | direction (towards upending) |
| 231 | direction (of elongate object) |
| 302 | horizontal plane |
| 520 | telescopic beam |
| 900 | elongate object |
| 901 | first end of elongate object |
| 902 | surface of elongate object |
| 903 | second end of elongate object |
| 1000 | vessel |
| 1001 | vessel deck |
| 1002 | Vessel deck level |
| 1100 | four bar system |
| 1101 | connection 1110 and 153 |
| 1102 | connection 1120 and 153 |
| 1110 | first bar |
| 1111 | first end 1110 |
| 1112 | second end 1110 |
| 1120 | second bar |
| 1121 | first end 1120 |
| 1122 | second end 1120 |
| 1130 | third bar |
| 1131 | first end 1130 |
| 1132 | second end 1130 |
| 1133 | first point of 1130 |
| 1134 | second point on 1130 |
| 1140 | fourth bar |
| 1141 | first end 1140 |
| 1142 | second end 1140 |
| 1145 | connection 1142 and 153 |
| 1200 | outrigger |
| 1202 | height of the outrigger |
| 1203 | lifting or folding system |
| 1204 | highest point of outrigger |
| 1511 | upper acute angled corner |

-continued

| | |
|---|---|
| 1513 | upper obtuse angled corner |
| 1514 | lower obtuse angled corner |
| 1521 | one part of extendible brace |
| 1522 | one part of extendible brace |
| 1523 | hinge axis of extendible brace |

The invention claimed is:

1. A handling system for transferring an elongate object from a storage location into an upending system, in particular on a vessel deck, the handling system comprising:

an upending system configured to upend said elongate object from a substantially horizontal position into a substantially vertical position;

a skidding system configured to lift and skid said elongate object from a storage location into said upending system;

wherein said upending system comprises:

a gripper unit configured to receive and grip a first end of the elongate object, the gripper unit including at least a first ring element configured to engage an outer surface of the elongate object; and a support structure including at least one frame configured to support said gripper unit;

wherein the gripper unit is tiltable between a first position in which a plane including the at least first ring element is substantially vertical and a second position in which said plane is substantially horizontal;

wherein each of the at least first ring element is openable laterally in said first position of the gripper unit to receive said elongate object laterally from the skidding system in said first position of the gripper unit; and wherein at least one of said at least one frame of the support structure is a movable frame comprising an extendible brace, said movable frame being movable between a first and a second configuration, the first configuration being a configuration with the extendible brace being in extended position in which the gripper unit is tiltable and the second configuration being a configuration with the extendible brace being in contracted position in which a height of said at least one of said at least one movable frame is reduced with respect to the first configuration.

2. The handling system according to claim 1, wherein the at least first ring element includes a single movable arm which is movable between a closed position of the at least first ring element and an open position of the at least first ring element.

3. The handling system according to claim 2, wherein the support structure is tiltable around a tilting axis, the at least first ring element includes a fixed ring part, the circumference of the at least first ring element being defined by the single movable arm and the fixed ring part, the least first ring element opens and closes by coupling and decoupling the single movable arm and the fixed ring part couple at a coupling point, the coupling point is positioned in an arc of the at least first ring element which arc is defined by a first radius under an angle of −10° and a second radius under an angle of 45°, wherein the radius at 0° being the radii defined by the intersection of the at least first ring element with the plane defined by the tilting axis and the central axis of the at least first ring element, the intersection being closest to the skidding system.

4. The handling system according to claim 2, wherein the single movable arm defines a sector of at least 120° of the at least first ring element.

5. The handling system according to claim 4, wherein at the opposite side of the connecting point, the single movable arm is hingedly connected to the fixed ring part at a hinging point, said hinging point is positioned in an arc of the at least first ring element which arc is defined by a first radius under an angle of 170° and a second radius under an angle of 200°.

6. The handling system according to claim 2, wherein the single movable arm includes a plurality of articulations.

7. The handling system according to claim 1, wherein the gripper unit further comprises a second ring element spaced apart from the first ring element.

8. The handling system according to claim 1, wherein said extendible brace is an articulating brace.

9. The handling system according to claim 1, wherein the skidding system includes at least an outer cart and an inner cart movable between a storage location of the elongate object and the upending system in a direction transverse to a storage direction of the elongate object, wherein said outer cart and said inner cart are configured to push up the elongate object from the storage location.

10. The handling system according to claim 9, wherein the outer cart is also movable in a direction in parallel with the elongate object when the elongate object is in the upending system.

11. The handling system according to claim 1 wherein the gripper unit being in tiltable connection to a first end of a moveable beam of the support unit, the gripper unit being tiltable around a tilting axis between a first position in which the plane defined by the tilting axis and the longitudinal axis of the gripper unit is substantially vertical and a second position in which said plane is substantially horizontal, said moveable beam being rotational around a first axis at the second end of the moveable beam, said tilting is controlled by means of a movable four-bar system comprising a first, a second, a third and a fourth bar, wherein said first and said second bar, preferably by their first ends, each are individually freely rotatably connected to said moveable beam at the same side in view of the tilting axis, the first bar being connected to the moveable beam at a first position closer to the tilting axis as compares to the second position at which the second bar is connected to the moveable beam;

the second end of the first bar being freely rotatably connected to a first point on the third bar;

the second end of the second bar being freely rotatably connected to a second point on the third bar;

first and second point on the third bar and the two connection points of the first and second bar to the moveable beam form the angles of a convex quadrilateral;

the fourth bar being at its first end freely rotatably connected to the first point on the third bar, the second end of the fourth bar being connected to the gripper unit, the second bar being an extendible bar;

the connection point of the fourth bar to the gripper unit and the first and second position on the moveable beam are at the same side of the plane defined by the tilting axis and the longitudinal axis of the gripping unit; and the connection point of the fourth bar to the gripper unit on the one hand, and the first and second position on the moveable beam at the other hand, are at a different side of the plane defined by the tilting axis and being perpendicular to the longitudinal axis of the gripping unit.

12. The system according to claim 1, said system configured to upright piles, including monopiles, of offshore wind turbines, said handling system being provided on a vessel, which vessel is adapted to transport and upright piles, like monopiles, of offshore wind turbines.

13. A vessel comprising a vessel deck including a handling system according to claim 1;

a storage system including at least one storage location configured to store an elongate object.

14. A method for transferring an elongate object from a storage location into an upending system, in particular on a vessel deck, the method comprising the steps of:

A. providing a handling system according to claim 1, wherein the skidding system includes at least an outer cart and an inner cart movable between a storage location of the elongate object and the upending system in a direction transverse to a storage direction of the elongate object, wherein said outer cart and said inner cart are configured to push up the elongate object from the storage location, the outer cart is also movable in a direction in parallel with the elongate object when the elongate object is in the upending system;

B. bringing the gripper unit in the first position (A);

C. move said movable frame to the second configuration;

D. opening the at least first ring element;

E. when further ring elements are provided in the gripper unit, opening all other ring elements;

F. moving one elongate object by said at least inner and outer cart in a direction transverse to said elongate object from the storage location of the elongate object to the upending system;

G. move said movable frame to the first configuration;

H. disconnect the inner cart from the elongate object and retract the inner cart back towards the storage location;

I move the outer cart in a direction in parallel with the elongate object when the elongate object is in the upending system to adjust the position of the elongate object in the open first ring element; and J. close the first ring element, and when further ring elements are provided in the gripper unit, close all other ring elements and disconnect the outer cart from the elongate object and retract the outer cart back towards the storage location.

* * * * *